United States Patent
Zamani et al.

(10) Patent No.: US 9,602,151 B1
(45) Date of Patent: Mar. 21, 2017

(54) APPARATUS AND METHOD FOR TRANSMITTING AND RECEIVING WIRELESS SIGNALS SUBJECT TO A SPECTRAL MASK

(71) Applicants: Mahdi Zamani, Ottawa (CA); Ahikam Aharony, Ottawa (CA); Zhuhong Zhang, Ottawa (CA); Chuandong Li, Ottawa (CA); Weikun Hou, Ottawa (CA)

(72) Inventors: Mahdi Zamani, Ottawa (CA); Ahikam Aharony, Ottawa (CA); Zhuhong Zhang, Ottawa (CA); Chuandong Li, Ottawa (CA); Weikun Hou, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/840,457

(22) Filed: Aug. 31, 2015

(51) Int. Cl.
| | |
|---|---|
| *H03H 7/30* | (2006.01) |
| *H04B 1/10* | (2006.01) |
| *H04L 5/00* | (2006.01) |
| *H04L 27/26* | (2006.01) |
| *H04L 27/00* | (2006.01) |

(52) U.S. Cl.
CPC ............ *H04B 1/10* (2013.01); *H04L 5/0044* (2013.01); *H04L 27/0014* (2013.01); *H04L 27/2602* (2013.01); *H04L 2027/0038* (2013.01)

(58) Field of Classification Search
CPC .................................................. H04L 27/2623
USPC ......................................................... 375/229
See application file for complete search history.

(56) References Cited

U.S. PATENT DOCUMENTS

| | | | | |
|---|---|---|---|---|
| 5,936,578 | A | * | 8/1999 | Driessen .............. H01Q 3/2676 329/304 |
| 5,949,796 | A | * | 9/1999 | Kumar ................... H04H 20/22 370/487 |
| 6,430,227 | B1 | * | 8/2002 | Kroeger ................. H04H 20/30 375/260 |
| 2008/0113624 | A1 | | 5/2008 | Seidel et al. |

(Continued)

OTHER PUBLICATIONS

P. S. Chow, et. al, "A Practical Discrete Multitone Transceiver Loading Algorithm for Data Transmission over Spectrally Shaped Channels", IEEE Transactions on Communications, vol. 4, No. 2/3/4, pp. 773-775, 1995.

(Continued)

*Primary Examiner* — Lihong Yu

(57) ABSTRACT

Provided is an apparatus and method for transmitting and receiving wireless signals. A transmitting apparatus has a signal processor and a transmitter. The signal processor is configured to generate a signal having a middle channel and at least one side channel. The transmitter is configured to wirelessly transmit the signal subject to a spectral mask that has shoulder regions. According to an embodiment of the invention, the signal processor generates the signal such that each side channel is positioned in one of the shoulder regions of the spectral mask. In this manner, bandwidth from the shoulder regions can be utilized by one or more side channels. Also provided is a receiving apparatus having a receiver configured to wirelessly receive the signal, and a signal processor configured to process the signal.

16 Claims, 15 Drawing Sheets

(56) References Cited

U.S. PATENT DOCUMENTS

| | | | |
|---|---|---|---|
| 2009/0243933 A1* | 10/2009 | Shirakawa | G01S 3/74 342/417 |
| 2010/0309793 A1* | 12/2010 | Choi | H04L 1/0016 370/252 |
| 2012/0114077 A1 | 5/2012 | Brannon et al. | |
| 2012/0163499 A1* | 6/2012 | Kim | H04L 27/3854 375/298 |
| 2012/0195207 A1 | 8/2012 | Mueck et al. | |
| 2013/0083778 A1 | 4/2013 | Wang | |
| 2014/0099116 A1 | 4/2014 | Bai et al. | |
| 2015/0372762 A1 | 12/2015 | Zhang et al. | |
| 2016/0204871 A1 | 7/2016 | Li et al. | |

OTHER PUBLICATIONS

ETSI EN 302 217-1 V2.1.1, European Telecommunications Standards Institute (Jul. 2013).

ETSI EN 302 217-2-1 V2.1.1, European Telecommunications Standards Institute (Dec. 2014).

ETSI EN 302 217-2-2 V2.2.1, European Telecommunications Standards Institute (Apr. 2014).

ETSI EN 302 217-3 V2.2.1, European Telecommunications Standards Institute (Apr. 2014).

ETSI EN 302 217-4-1 V1.4.1, European Telecommunications Standards Institute (Jan. 2010).

ETSI EN 302 217-4-2 V1.5.1, European Telecommunications Standards Institute (Jan. 2010).

ETSI EN 302 307 V1.3.1, European Telecommunications Standards Institute (Mar. 2013).

ETSI EN 302 307-1 V1.4.1, European Telecommunications Standards Institute (Nov. 2014).

ETSI EN 302 307-2 V1.1.1, European Telecommunications Standards Institute (Feb. 2015).

BridgeWave Communications, "BridgeWave's AdaptRate Solutions", downloaded on Jun. 1, 2015 from http://www.bridgewave.com/solutions/downloads/WP_AdaptRate.pdf.

DragonWave Inc., "DragonWave Harmony Enhanced", downloaded on Jun. 1, 2015 from http://www.dragonwaveinc.com/products/packet-microwave/harmony-enhanced.

Jonas Hansryd and Jonas Edstam, "Microwave capacity evolution", Ericsson Review (Jan. 2011).

* cited by examiner

US 9,602,151 B1

APPARATUS AND METHOD FOR TRANSMITTING AND RECEIVING WIRELESS SIGNALS SUBJECT TO A SPECTRAL MASK

FIELD OF THE INVENTION

This application relates to wireless communication, and more particularly to transmitting and receiving wireless signals that are subject to a spectral mask.

BACKGROUND

Networks that provide wireless access may include wireless backhaul connectivity between network nodes, for example using microwave signals. The microwave signals are transmitted with enough power to achieve an acceptable Signal to Noise Ratio (SNR). The required power level depends on channel conditions. For instance, during favorable channel conditions, the microwave signals may be transmitted with relatively low power. Conversely, in poor channel conditions, the microwave signals may need to be transmitted with relatively high power.

However, transmitting the microwave signals with too much power can result in interference between adjacent channels. As such, the microwave signals are subject to a spectral mask, which defines a maximum allowed transmit power over a range of frequencies as a function of frequency. The spectral mask is generally intended to reduce interference between adjacent channels by limiting transmission power. Spectral masks have been defined by various standardization bodies such as the International Telecommunication Union (ITU), the Federal Communications Commission (FCC), the Electronic Communications Committee (ECC), the European Conference of Postal and Telecommunications Administrations (CEPT), the European Telecommunications Standards Institute (ETSI) and other standardization bodies.

When microwave signals are transmitted with relatively low power, the microwave signals can be transmitted with wider bandwidth while still complying with the spectral mask. There is a desire to achieve improved spectral efficiency in these wider bandwidth transmissions.

SUMMARY

The invention provides apparatuses and methods for transmitting and receiving wireless signals that are subject to a spectral mask, such as microwave or millimeter wave signals.

A transmitting apparatus provided by an embodiment of the invention has a signal processor and a transmitter. The signal processor is configured to generate a signal having a middle channel and at least one side channel. The transmitter is configured to wirelessly transmit the signal subject to a spectral mask that has shoulder regions. According to an embodiment of the invention, the signal processor generates the signal such that each side channel is positioned in one of the shoulder regions of the spectral mask. In this manner, bandwidth from the shoulder regions can be utilized by one or more side channels. Also, the middle channel may have a higher power level than the side channels thereby allowing a higher ACM and greater spectral efficiency for the middle channel.

A receiving apparatus provided by an embodiment of the invention has a receiver and a signal processor. The receiver is configured to wirelessly receive a signal subject to a spectral mask that has shoulder regions. The signal has a middle channel and at least one side channel. According to an embodiment of the invention, each side channel is positioned in one of the shoulder regions of the spectral mask. In this manner, bandwidth from the shoulder regions can be utilized by one or more side channels. Also, the middle channel may have a higher power level than the side channels thereby allowing a higher ACM and greater spectral efficiency for the middle channel. The signal processor is configured to process the signal to separate a first spectrum for the middle channel and a second spectrum for each side channel, process the first spectrum to recover a first data stream, and process each second spectrum to recover a second data stream.

Other aspects and features of the present invention will become apparent, to those ordinarily skilled in the art, upon review of the following description of the various embodiments of the invention.

BRIEF DESCRIPTION OF THE DRAWINGS

Embodiments will now be described by way of example with reference to the attached drawings in which.

DETAILED DESCRIPTION OF EMBODIMENTS

It should be understood at the outset that although illustrative implementations of one or more embodiments of the present invention are provided below, the disclosed systems and/or methods may be implemented using any number of techniques. The invention should in no way be limited to the illustrative implementations, drawings, and techniques illustrated below, including the designs and implementations illustrated and described herein, but may be modified within the scope of the appended claims along with their full scope of equivalents.

Introduction

Figure 1:
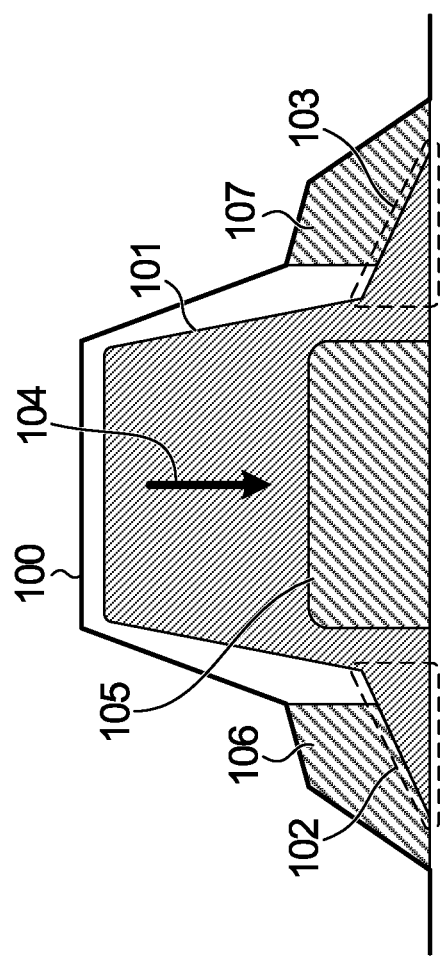
FIG. 1 is a schematic diagram depicting an example spectral mask.

The original purpose of the shoulder regions of the conventional spectral mask was to accommodate some degree of distortion to a channel without affecting neighboring channels. To illustrate this point, reference is made to FIG. 1, which is a schematic diagram depicting an example spectral mask 100 with shoulder regions 106, 107 for accommodating distortions of a channel 101 at a high power level. In particular, as shown in FIG. 1, portions 102, 103 of the channel 101 extend outward due to non-linear distortions. However, because the spectral mask 100 has shoulder regions 106, 107, the channel 101 does not extend outside of the spectral mask 100. The shoulder regions 106, 107 define a cap on the amount of out of band (relative to middle channel) interference that is deemed acceptable or tolerable within a given system.

The amount of distortion is generally greater when the channel 101 is transmitted at a higher power level. If the power level is decreased as shown by arrow 104, for example, due to improving channel conditions in which the high power is not needed, then a resulting power spectral density 105 does not have significant distortions extending outward such as the portions 102, 103 as shown. More generally, as the power level of the channel 101 is decreased, the magnitude of the portions 102, 103 will also decrease. If the channel conditions improve to a point where the middle channel can be transmitted with very low power, then the out of band interference may be negligible.

Embodiments of the invention utilize the shoulder regions of a spectral mask to transmit or receive one or more side channels by making use of available bandwidth in the frequency range corresponding to the shoulder regions. To illustrate this point, reference is made to FIG. 2, which is a schematic diagram depicting a signal having a middle channel 201 and side channels 202, 203 subject to the spectral mask 100 of FIG. 1. The middle channel 201 and the two side channels 202, 203 are both shown with power and frequency characteristics that satisfy the spectral mask 100. By positioning each side channel 202, 203 in the shoulder regions 106, 107 of the spectral mask 100, available bandwidth from the shoulder regions 106, 107 can be utilized. Thus, the combination of the middle channel 201 and the two side channels 202, 203 can better utilize the bandwidth available within the spectral mask 100.

In some implementations, using the shoulder regions 106, 107 for the side channels 202, 203 may improve throughput by up to 50% compared to not using the side channels 202, 203 at all. In particular, if the middle channel 201 has bandwidth B, and each side channel 202, 203 has bandwidth B/4, then the total bandwidth may be 1.5 B, which is an improvement of 50%. However, actual improvement in throughput will depend on spectral efficiency, which in turn will depend on channel conditions. For example, if the middle channel 201 must be transmitted with high power due to poor channel conditions, then the middle channel 201 might cause ICI for the side channels 202, 203 due to non-linear distortions as previously discussed for FIG. 1, and such ICI may limit an ACM for the side channels 202, 203 thereby limiting throughput. Specific possible results are presented below with reference to FIGS. 14-16.

Figure 2:
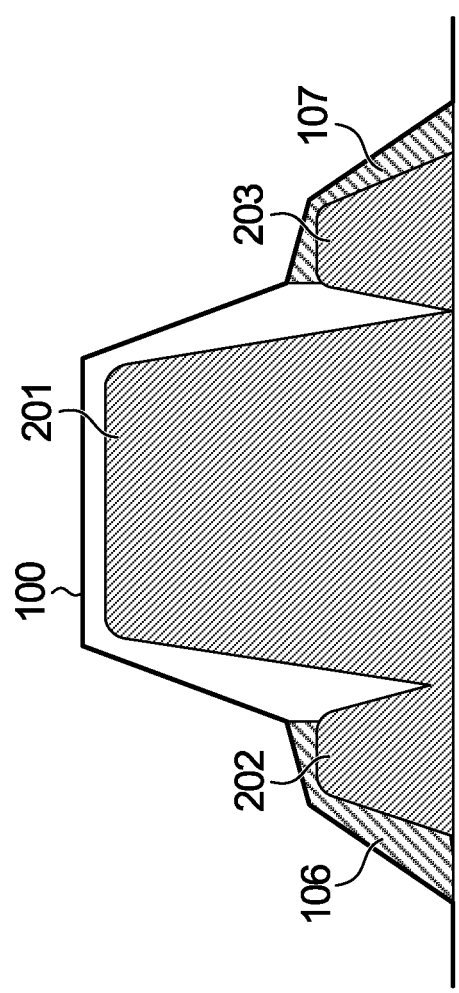
FIG. 2 is a schematic diagram depicting a signal having a middle channel and side channels subject to the spectral mask of FIG. 1, in accordance with an embodiment of the invention.

Although embodiments of the invention focus on implementations in which signals have a middle channel and two side channels as shown, for example, in FIG. 2, it is to be understood that other implementations are possible in which a different number of side channels may be present. For example, in an alternative implementation, there may be four side channels (e.g. two side channels on each side of the middle channel). In another implementation, there may be a single side channel (i.e. a side channel on one side of the middle channel and no side channel on the other side of the middle channel). Other implementations are possible.

Apparatus for Transmitting and Receiving Wireless Signals

Figure 3:
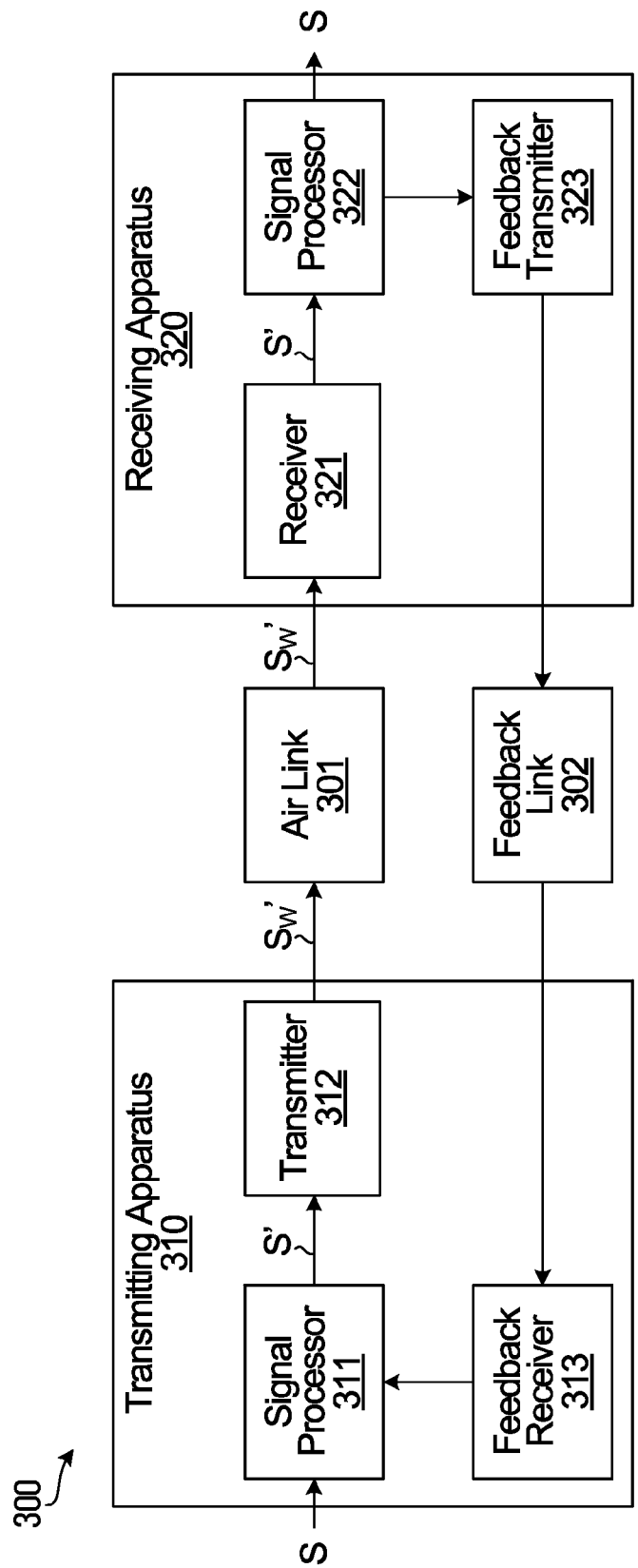
FIG. 3 is a block diagram of a wireless communication system, in accordance with an embodiment of the invention.

Referring now to FIG. 3, shown is a schematic diagram of a wireless system 300 having a transmitting apparatus 310 and a receiving apparatus 320, in accordance with an embodiment of the invention. The transmitting apparatus 310 has a signal processor 311, a transmitter 312, a feedback receiver 313, and may have other components that are not specifically shown. The signal processor 311, the transmitter 312, and the feedback receiver 313 may be co-located, or installed in different locations. The receiving apparatus 320 has a receiver 321, a signal processor 322, a feedback transmitter 323, and may have other components that are not specifically shown. The receiver 321, the signal processor 322, and the feedback transmitter 323 may be co-located, or installed in different locations.

Operation of the wireless system 300 will now be described. The transmitting apparatus 310 generates a transmitter-side signal S containing data to be transmitted over an air link 301 to the receiving apparatus 320. The data may, for example, be a data stream provided by a processor (not shown). The signal processor 311 of the transmitting apparatus 310 is configured to process the transmitter-side signal S to generate a processed transmitter-side signal S'. The processed signal S' has a middle channel and at least one side channel. An example of such processing is described later with reference to FIG. 5. The transmitter 312 is configured to transmit the processed signal S' as a wireless signal $S'_W$, which includes the middle channel and each side channel subject to a spectral mask. An example spectrum for the wireless signal $S'_W$ is depicted in FIG. 2, which depicts the spectral mask 100, the center channel 201 and the side channels 202, 203. The wireless signal $S'_W$ travels over the air link 301 to the receiving apparatus 320.

A receiver-side wireless signal $S^W$ is wirelessly received by the receiving apparatus 320. The receiver 321 of the receiving apparatus 320 recovers receiver-side signal S' from the wireless signal $S^W$. The signal processor 322 of the receiving apparatus 320 processes the recovered signal S' in a manner that is complementary to the signal processor 311 of the transmitting apparatus 310 such that the signal processor 322 of the receiving apparatus 320 may recover the signal S.

The wireless signal $S'_W$ as transmitted is subject to a spectral mask having shoulder regions. Practically, this means that the transmitting apparatus 310 is responsible for ensuring that the power of the transmitted signal at a given frequency does not exceed the amount specified by the spectral mask. In some embodiments, the signal processor 311 of the transmitting apparatus 310 generates the processed signal S' so that the processed signal S' complies with the spectral mask. Thus, when the transmitter 312 transmits the wireless signal $S'_W$ based on the processed signal S', the wireless signal $S'_W$ complies with the spectral mask. More generally, the signal processor 311 generates the processed signal S' such that the wireless signal S'$_W$ that is transmitted complies with the spectral mask.

In some embodiments, the signal processor 311 of the transmitting apparatus 310 is configured to selectively enable or disable one or more side channels, for example, based on channel conditions. For example, for implementations in which signals have a middle channel and two side channels as shown in FIG. 2, each side channel may be selectively enabled or disabled based on channel conditions. If channel conditions are favorable for both side channels, then both side channels are used. Channel conditions may be favorable when there is a low amount of interference from other transmissions in neighboring channels. However, if channel conditions are not favorable for the first side channel, then the first side channel can be disabled. The second side channel, which may have favorable channel conditions, may be enabled notwithstanding the first side channel being disabled. In alternative implementations, both side channels are enabled at the same time.

The spectral mask 100 shown in FIGS. 1 and 2 is only an example and other spectral masks of varying shapes and sizes are possible. To illustrate this point, reference is made to FIGS. 4A through 4D, which are schematic diagrams depicting other example spectral masks. Each schematic diagram shows half of a spectral mask beginning at the center frequency $f_0$. It is to be understood that each spectral mask is symmetrical about the center frequency $f_0$.

Figure 4B:
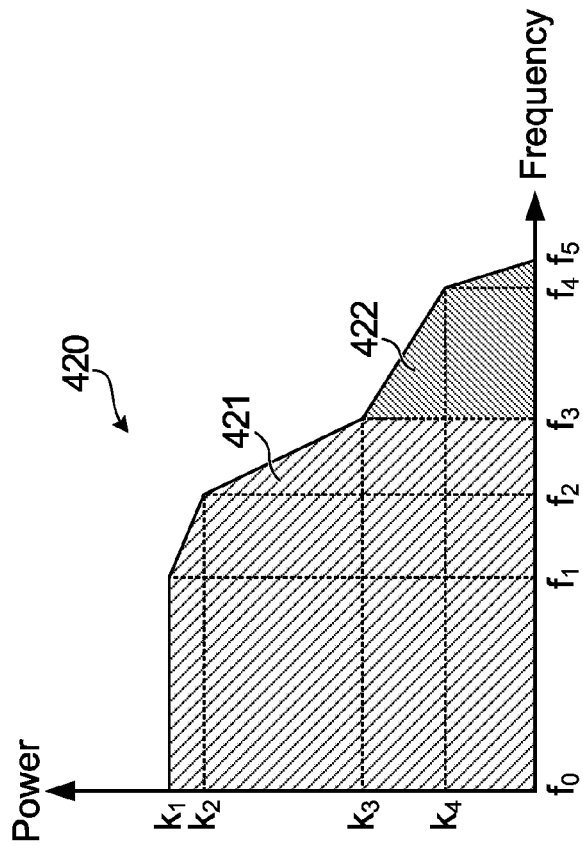
FIGS. 4A through 4D are schematic diagrams depicting other example spectral masks.
Figure 4A:
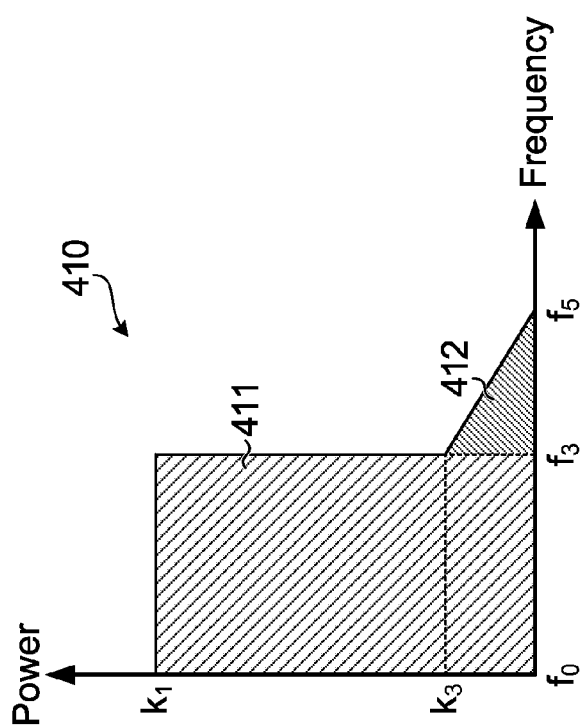

FIG. 4A shows a spectral mask 410 having a middle region 411 and a shoulder region 412. The middle region 411 is bounded by a power level $k_1$ in the frequency range of $f_0$ to $f_3$. The shoulder region 412 is bounded by a power level ranging from $k_3$ to a minimum value in the frequency range of $f_3$ to $f_5$.

FIG. 4B shows a spectral mask 420 having a middle region 421 and a shoulder region 422. The middle region 421 is bounded by a power level $k_1$ in the frequency range of $f_0$ to $f_1$, a power level ranging from $k_1$ to $k_2$ in the frequency range of $f_1$ to $f_2$, and a power level ranging from $k_2$ to $k_3$ in the frequency range of $f_2$ to $f_3$. The shoulder region 422 is bounded by a power level ranging from $k_3$ to $k_4$ in the frequency range of $f_3$ to $f_4$, and a power level ranging from $k_4$ to a minimum value in the frequency range of $f_4$ to $f_5$.

Figure 4C:
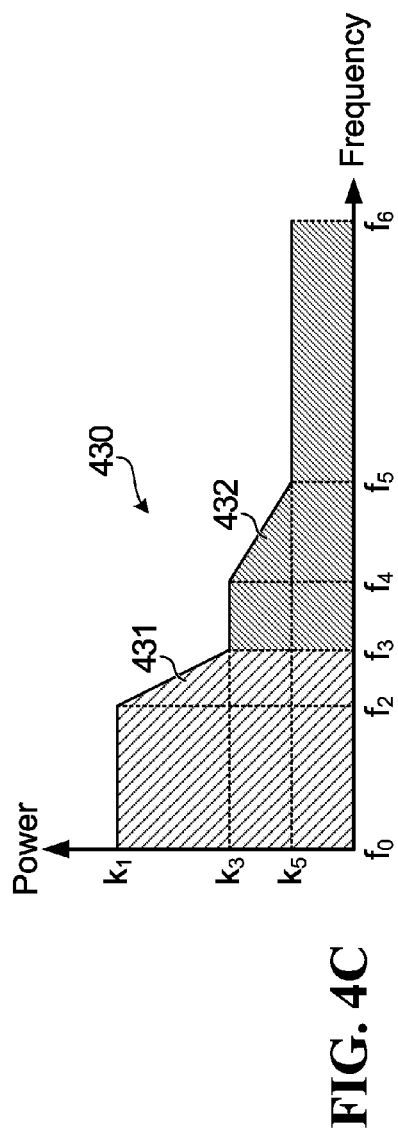

FIG. 4C shows a spectral mask 430 having a middle region 431 and a shoulder region 432. The middle region 431 is bounded by a power level $k_1$ in the frequency range of $f_0$ to $f_2$, and a power level ranging from $k_1$ to $k_3$ in the frequency range of $f_2$ to $f_3$. The shoulder region 432 is bounded by a power level $k_3$ in the frequency range of $f_3$ to $f_4$, a power level ranging from $k_3$ to $k_5$ in the frequency range of $f_4$ to $f_5$, and a power level $k_5$ in the frequency range of $f_5$ to $f_6$.

Figure 4D:
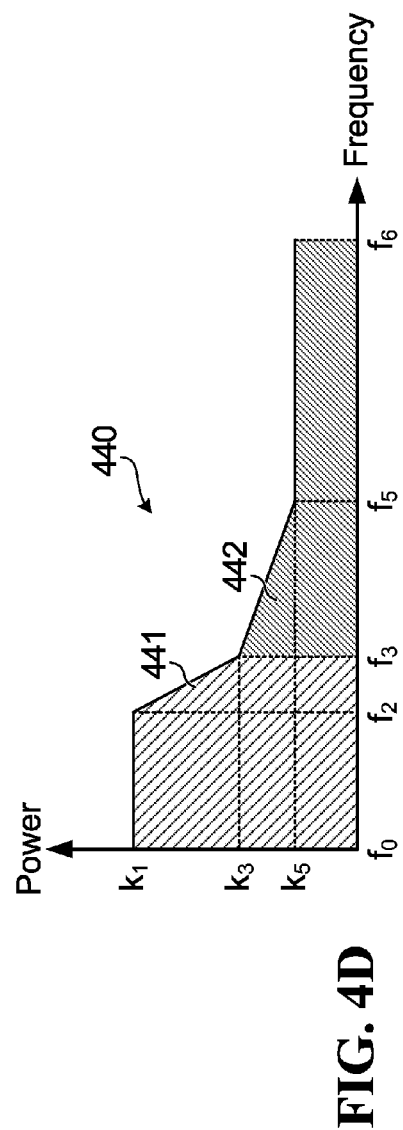

FIG. 4D shows a spectral mask 440 having a middle region 441 and a shoulder region 442. The middle region 441 is bounded by a power level $k_1$ in the frequency range of $f_0$ to $f_2$, and a power level ranging from $k_1$ to $k_3$ in the frequency range of $f_2$ to $f_3$. The shoulder region 442 is bounded by a power level ranging from $k_3$ to $k_5$ in the frequency range of $f_3$ to $f_5$, and a power level $k_5$ in the frequency range of $f_5$ to $f_6$. In some implementations, $f_6$ is equal to 2.5 times the channel spacing.

In the foregoing examples with reference to FIGS. 4A through 4D, it is to be understood that the subscripts for the power levels and the frequencies are used merely to distinguish the power levels and the frequencies from one another within the same spectral mask. While the same subscripts may be used in different spectral masks, this does not imply that the power levels and the frequencies of the different spectral masks must be the same. For example, $f_3$ in FIG. 4A is not necessarily the same as $f_3$ in FIG. 4B even though the same subscript is used. Also, the subscripts do not imply any specific magnitude in relation to one another.

FIGS. 4A through 4D demonstrate that there is a wide range of possible shapes and sizes for spectral masks. However, the shape and size of the spectral mask is normally constant in a given wireless communication system. In some implementations, the number of channels and/or modulation order of the channels can be adjusted within the confines of the shape and size of the spectral mask. Based on the shape and size of the spectral mask, each channel may have a power level and baud-rate designed for spectral efficiency.

Having regard to FIGS. 4A through 4D, a boundary between the middle region and the shoulder region occurs approximately at a frequency at which the spectral mask exhibits positive concavity (i.e. a positive change of slope). In FIGS. 4A through 4D, this frequency is at $f_3$. The positive concavity forms the shoulder regions.

However, it is to be understood that the boundary between the middle region and the shoulder region does not necessarily need to be exactly where the spectral mask exhibits positive concavity. For example, with reference to FIG. 4B, the shoulder region 422 could alternatively be considered to start somewhere between the frequencies $f_4$ and $f_5$. Furthermore, some spectral masks may have more than one point with positive concavity. In such cases, the shoulder region may start at one of the points with positive concavity or at some other point.

In general, the precise boundaries of a shoulder region of a spectral mask may depend on the particular shape of the spectral mask, but the precise boundaries are normally related to a frequency at which a spectral mask exhibits positive concavity. Embodiments of the invention allow side channels to be positioned in the shoulder regions. In this manner, bandwidth from the shoulder regions can be utilized by one or more side channels. The middle channel may have a higher power level than the side channels thereby allowing a higher ACM and greater spectral efficiency for the middle channel.

It is to be understood that the side channels do not have to be completely positioned in the shoulder regions. In general, a substantial portion of the side channels is positioned in the shoulder regions. Thus, for example, 80% of a side channel may be positioned in a shoulder region while 20% of the side channel is in the middle region.

Referring back to FIG. 3, the air link 301 may attenuate the wireless signal S'$_W$, especially if there is precipitation such as rain. Also, there may be interference from other transmissions. Thus, the wireless signal S$^W$ that reaches the receiving apparatus 320 will not be exactly identical to the wireless signal S'$_W$ that has been transmitted. In general, the air link 301 is not perfect, and such imperfections can limit the ACM for the middle channel and each side channel.

In some implementations, based on channel conditions, the signal processor 311 of the transmitting apparatus 310 adjusts throughput of the wireless signal S'$_W$ by adjusting the power and/or the ACM of the middle channel. Furthermore, the signal processor 311 of the transmitting apparatus 310 selects an ACM of each side channel. In some implementations, the power level of the side channels is maintained at a constant value to fit in the shoulder regions of the spectral mask. However, in alternative implementations, the power level of the side channels can also be set based on channel conditions, to the extent that the side channels still comply with the spectral mask.

As mentioned above, the power level of the middle channel may have a significant impact on the ACM that can be achievable for each side channel, as the middle channel may cause interference to the shoulder regions of the spectral mask resulting in ICI for any side channels that are present, particularly when the middle channel is transmitted with a high power. As such, in some implementations, the power level on the middle channel is reduced as much as it can be, while still achieving a best possible throughput on the middle channel. For example, there may be a maximum throughput that is defined by the available set of ACMs that can be used in the system. So long as that ACM is used, the best possible throughput can be achieved. By reducing the power on the center channel while maintaining the maximum throughput, a side benefit is that the interference with the shoulder portions is reduced, and the ACM used for the side channels can be increased, which can increase overall throughput. If the channel conditions permit the same modulation constellation to be transmitted on the middle channel but with very low power, then the out of band interference may be negligible.

Referring back to FIG. 3, the wireless system 300 implements feedback over a feedback link 302. The feedback link 302 might, for example, be an existing channel of an air link from the receiving apparatus 320 to the transmitting apparatus 310. The feedback link 302 uses a small portion of the air link for adaptive system mechanisms such as ACM. In other implementations, the feedback link 102 is a wired link. The signal processor 322 of the receiving apparatus 320 is configured to determine signal quality, and the feedback transmitter 323 of the receiving apparatus 320 is configured to send feedback based on the signal quality. The feedback is received by the feedback receiver 313 of the transmitting apparatus 310. The signal processor 311 is configured to, based on the feedback, adjust throughput of the wireless signal $S'_W$ as described earlier, typically by adjusting or varying the ACM and/or the power of the middle channel, and/or by varying the ACM of the side channels. Additionally, or alternatively, the feedback is used to selectively enable or disable each side channel.

In some implementations, the feedback includes an indication of the signal quality for the middle channel and each side channel. This may include three distinct indications of signal quality (i.e., one indication per channel). For each channel, the indication may, for example, include an SNR. However, other indications of signal quality are possible and are within the scope of the invention.

Based on the per-channel feedback, the power and/or ACM of the corresponding channel may be adjusted. In particular, if channel conditions for the middle channel are good, the throughput of the middle channel can be increased if not already at the maximum. If already at the maximum, then the transmit power for the middle channel can be reduced. In some implementations, this may be repeated such that a minimum transmission power that still yields the maximum throughput may be used. The ACM used on each side channel is adjusted based on feedback for the side channel. Typically, as the power level on the middle channel is reduced, the resulting improvement in channel conditions for the side channel will allow the ACM to be adjusted to a more aggressive value.

In some implementations, for a given ACM, the power level on the middle channel is set to a minimum amount that still allows that ACM, and for each side channel, the signal processor 311 of the transmitting apparatus 310 sets the ACM to achieve a high throughput for the side channel. In some implementations, the signal processor 311 of the transmitting apparatus 310 selects the ACM that allows for a greatest achievable error-free throughput for the side channels, given the current channel conditions. This ACM for the middle channel may result in lower throughput for the middle channel than would be possible with a more aggressive ACM, although the resulting gains from the side channels may make up for the loss in throughput by the middle channel. A goal is to maximize overall spectral efficiency based on the feedback, and this might not always be achieved by using the most aggressive ACM for the middle channel.

In some implementations, as mentioned above, the side channels have constant power. This ensures that the side channels fit in the shoulder regions of the spectral mask. However, in alternative implementations, the signal processor 311 of the transmitting apparatus 310 sets the power level of the side channels based on the feedback. The extent to which the power level of the side channels can be manipulated may be based on the shape and size of the spectral mask. A spectral mask with relatively large shoulder regions may allow some freedom to manipulate the power level of the side channels.

In some implementations, the feedback includes an indication to enable or disable a side channel. The indication may be an explicit indication (e.g. a command to enable or disable a side channel), or an implicit indication (e.g. an indication of signal quality from which it can be inferred that a side channel should be disabled). A side channel may be disabled, for example, if channel conditions are too poor to support the side channel.

In some embodiments, there is no feedback from the receiving apparatus 320 to the transmitting apparatus 310. In some embodiments, the transmitting apparatus 310 sets power levels and the ACM for the middle and side channels such that robust communication is expected to be possible under a wide variety of channel conditions including poor conditions due to precipitation. However, this approach may not take full advantage of greater throughput that would be possible during favorable channel conditions. In other implementations, the transmitting apparatus 310 checks the weather or the weather forecast from time to time, and varies the power levels and the ACM for the middle and side channels accordingly.

In some implementations, the transmitting apparatus 310 and the receiving apparatus 320 have similar or even identical configurations. In particular, the receiving apparatus 320 may also have components for processing and transmitting data, and the transmitting apparatus 310 may also have components for receiving and processing data. Thus, the receiving apparatus 320 may be capable of transmitting data, and the transmitting apparatus 310 may be capable of receiving the data. In other words, data communication may be supported in both directions.

In some implementations, the wireless system 300 uses microwave communication between the transmitting apparatus 310 and the receiving apparatus 320. A microwave signal might, for example, have a frequency of 38 GHz, which is a frequency that may also be described as a millimeter wave because its wavelength is less than one centimeter. Thus, according to some implementations, the wireless system 300 can be said to use microwave communication or millimeter wave communication. The wireless system 300 might, for example, be part of a back-haul network. In specific implementations, the transmitting apparatus 310 and the receiving apparatus 320 include back-haul microwave modems. However, other forms of wireless communication are possible and are within the scope of the invention. For example, in other implementations, the wireless system 300 uses any single carrier, high spectral efficiency communication technique, for example Digital Video Broadcasting—$2^{nd}$ Generation (DVB-S2) as defined by the European Telecommunications Standards Institute in EN 302 307 (i.e. satellites communication).

There are many possibilities for the signal processor 311 of the transmitting apparatus 310 and the signal processor 322 of the receiving apparatus 320. In some implementations, the signal processors 311, 322 are Digital Signal Processors (DSPs). In alternative implementations, the signal processors 311, 322 are analog signal processors. More generally, the signal processors 311, 322 can be any appropriately configured processors for processing signals as described herein. While shown as a single element, each of the signal processors 311, 322 may be implemented as a combination of multiple components. Example signal processor implementations are described below with reference to FIGS. 5-10.

Example Signal Processor Implementations

Figure 5:
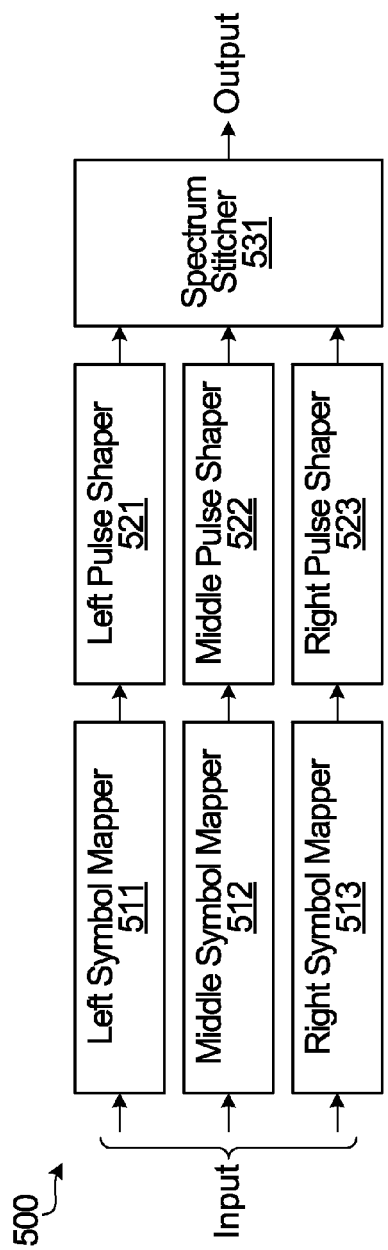
FIG. 5 is a block diagram of an example signal processor of a transmitting apparatus, in accordance with an embodiment of the invention.
Figure 6:
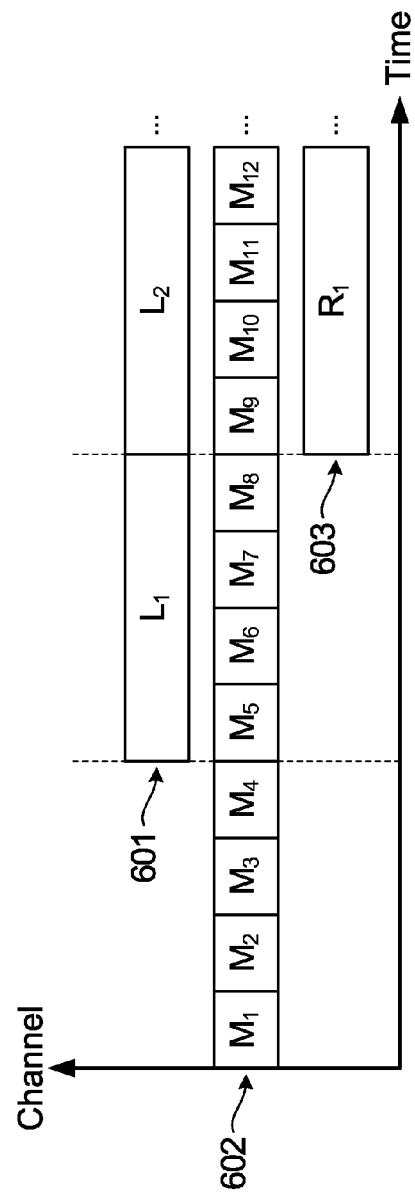
FIG. 6 is a signaling diagram showing example symbol streams that may be generated by the signal processor of FIG. 5.

Referring now to FIG. 5, shown is block diagram of an example signal processor 500 of a transmitting apparatus, in accordance with an embodiment of the invention. The signal processor 500 of FIG. 5 is an example embodiment of the signal processor 311 of FIG. 3 and might, for example, be implemented in a DSP. It is to be understood that the signal processor 500 is shown with very specific components in a very specific arrangement for illustrative purposes only. Other configurations are possible and are within the scope of the invention.

Information bits after a Forward Error Correction (FEC) encoder (not shown) are split in three branches with a Serial-to-Parallel (S2P) module (not shown). The three branches include a left branch for a left channel, a middle branch for a middle channel, and a right branch for a right channel. The middle channel generated by the middle branch normally has more bandwidth than each side channel, and may also be more spectrally efficient than each side channel. Therefore, the middle branch normally has a higher data-rate than the side branches.

Next, the information bits are mapped to their corresponding constellations by symbol mappers 511, 512, 513. The mapping of the bits to the constellations is also referred to as bit-loading. The symbol mappers 511, 512, 513 include a left symbol mapper 511 for the left branch, a middle symbol mapper 512 for the middle branch, and a right symbol mapper 513 for the right branch. In some implementations, the middle symbol mapper 512 uses 2048QAM (i.e. 11 bits per symbol) while the left symbol mapper 511 and the right symbol mapper 513 use 16QAM (i.e. 4 bits per symbol). However, other constellations are possible.

In some implementations, the ACMs for the middle channel and the side channels are adapted based on channel conditions. For each channel, this will determine the size of the constellation, and number of bits per symbol (determined by constellation size and coding rate). When channel conditions are favorable for a given channel, more bits can be used per symbol, which results in greater throughput. Conversely, when channel conditions are poor, fewer bits can be used per symbol, which results in lower throughput.

The modulation order for the side channels is determined by a power ratio of actual transmit power at a middle of the spectral mask and actual transmit power at a side of the spectral mask. For example, if the difference is 20 dB, then the modulation order for the side channel can be set to 64QAM or some lower order modulation. 64QAM is achievable with SNR of 19 dB with an FEC rate of 7/8. As a rule of thumb, in a pure Additive White Gaussian Noise (AWGN) channel, if the power difference of the signal at the middle of the spectral mask and the signal at the side of the spectral mask is P in dB, then the spectral efficiency difference between the main channel and the side channel is approximately P/log(2).

After the symbol mapping, the symbols are processed and shaped by pulse shapers 521, 522, 523. The pulse shapers 521, 522, 523 include a left pulse shaper 521 that generates a spectrum for the left branch, a middle pulse shaper 522 that generates a spectrum for the middle branch, and a right pulse shaper 523 that generates a spectrum for the right branch. In some implementations, the pulse shapers 521, 522, 523 also perform pre-compensation in order to compensate for any non-linear distortion created by power amplification.

Next, a spectrum stitcher 531 generates a signal having the three channels side-by-side as shown in FIG. 2 for example. This involves stitching together the spectrum for the left channel, the spectrum for the middle channel, and the spectrum for the right channel. Spectrum stitching can be implemented in a frequency domain with an Inverse Fast Fourier Transform (IFFT) of catenation of a Fast Fourier Transform (FFT) of the channel signals, or in a time domain using a Numerically Controlled Oscillator (NCO) by multiplying the side channel signals by $e^{\pm j2\pi f_c t}$, where $\pm f_c$ is the center frequency for the side channels. This multiplication is performed in baseband with the center frequency $f_c$ being zero, and then the resulting signals can be upconverted. It is also possible to generate the signals directly in RF, in which case the center frequency $f_c$ of a side channel is an offset from the center frequency $f_0$ of the middle channel. The value for the center frequency $f_c$ could be as low as the average of baud-rate of the middle channel and the side channel. For example, if main channel has baud-rate of $f_{b1}$ and the side channel has baud-rate of $f_{b2}$, then $f_c = (f_{b1} + f_{b2})/2$.

In some implementations, the middle channel and the side channels all have synchronous timing with a common clock. To illustrate this point, reference is made to FIG. 6, which is a signalling diagram showing example symbol streams that may be generated by the symbol mappers 511, 512, 513 of the signal processor 500 of FIG. 5. The symbol streams include a left symbol stream 601 (with symbols $L_1, L_2, \ldots$) for the left channel, a middle symbol stream 602 (with symbols $M_1, M_2, \ldots$) for the middle channel, and a right symbol stream 603 (with symbols $R_1, \ldots$) for the right channel.

The symbol rate of the middle symbol stream 602 is four times the symbol rate of the left symbol stream 601 and the right symbol stream 603 in this example. The middle channel may use different power and a higher-order constellation than the side channels. Regardless, the middle symbol stream 602 and the side symbol streams 601, 603 share alignment with a common clock. In particular, each symbol for the side symbol streams 601, 603 is aligned with a corresponding set of four symbols of the middle symbol stream 602. Other symbol rates are possible.

Although the middle symbol stream 602 and the side symbol streams 601, 603 share alignment with a common clock, the middle symbol stream 602 and the side symbol streams 601, 603 do not have to be transmitted at the same time. For example, the side symbol streams 601, 603 can be transmitted later than the middle symbol stream 602. In the illustrated example, the side symbol streams 601, 603 are shown to be shifted in time relative to the middle symbol stream 602.

If the middle channel and the side channels all have synchronous timing with a common clock, then on the receiver side some processing such as clock recovery can be performed for one of the channels such as the middle channel, and then applied across all channels. However, in some implementations, additional processing may be performed for the side channels due to ICI on the side channels from the middle channel. As mentioned above with reference to FIG. 1, there may be ICI on the side channels from the main channel, especially if the power level of the main channel is high. Such processing on the receiver side will be described in further detail below with reference to FIG. 7.

Figure 7:
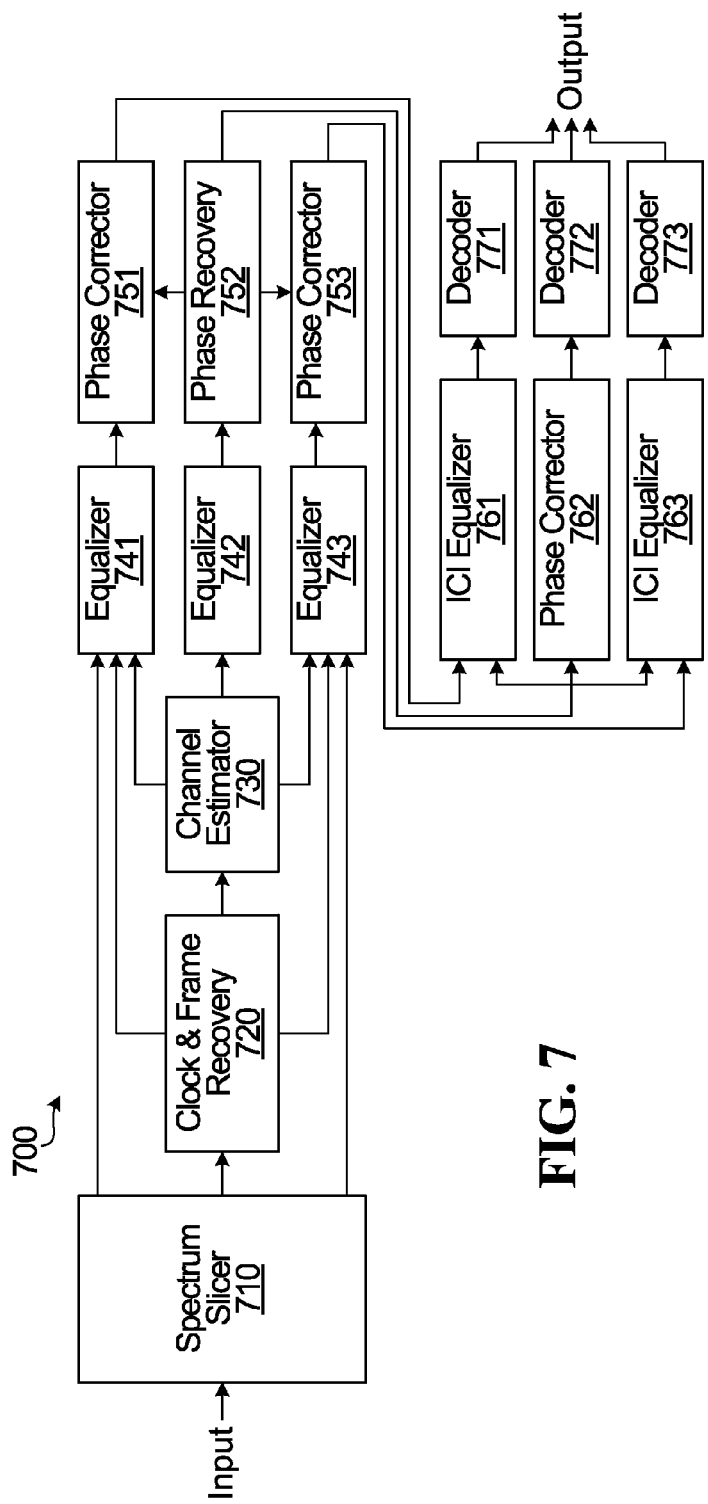
FIG. 7 is a block diagram of an example signal processor of a receiving apparatus, in accordance with an embodiment of the invention.

Referring now to FIG. 7, shown is a schematic diagram of an example signal processor 700 of a receiving apparatus having ICI equalization, in accordance with an embodiment of the invention. The signal processor 700 of FIG. 7 is an example embodiment of the signal processor 322 of FIG. 3 and might, for example, be implemented in a DSP. It is to be understood that the signal processor 700 is shown with very specific components in a very specific arrangement for illustrative purposes only. Other configurations are possible and are within the scope of the invention.

The signal processor 700 receives an input signal having a middle channel and at least one side channel. The channels are sliced by a spectrum slicer 710. In particular, the spectrum slicer 710 separates a spectrum for the left channel, a spectrum for the middle channel, and a spectrum for the right channel. Spectrum slicing can be implemented in either a frequency domain or a time domain. Each channel is processed in parallel as described below.

In some implementations, some processing such as clock recovery, channel estimation, and carrier phase recovery can be performed for one of the channels such as the middle channel, and then applied across all channels. This may simplify the design and reduce power consumption. In this particular example, a clock & frame recovery block 720 and a channel estimator 730 process the middle channel, and results of that processing are applied to the side channels. The clock & frame recovery block 720 might, for example, perform a PLL-based carrier recovery.

Next, each channel is processed by a respective equalizer 741, 742, 743. The complexity of the equalizers 741, 742, 743 may depend on expected maximum baud-rates of the channels. In particular, the equalizer 742 for the middle channel may have greater complexity than the equalizers 741, 743 for the side channels, particularity if the side channels have lower baud-rate than the middle channel. The greater complexity of the equalizer 742 for the middle channel enables the equalizer 742 to process the greater baud-rate.

Next, the center channel is processed by phase recovery block 752, and the results of that processing are applied across all channels. In particular, phase correction of the side channels is performed by phase correctors 751, 753 based on the results from the phase recovery block 752. Phase correction of the middle channel is performed by phase corrector 762.

The power level of the side channels is relatively small, so they do not normally produce significant interference on neighboring channels or on the middle channel. However, as mentioned above, the power level of the middle channel can cause ICI on the side channels, especially when the power level of the middle channel is very high. In some implementations, this ICI can be mitigated by ICI equalizers 761, 763. The ICI equalizers 761, 763 might, for example, be symbol-rate equalizers. The ICI equalizers 761, 763 perform interference cancellation to compensate interference in each side channel from the middle channel. In some implementations, the ICI equalizers 761, 763 use a result of the processing of the middle channel, for example the output from the phase recovery 752, when performing the interference cancellation for the side channels.

Finally, the signal processor 700 has decoders 771, 772, 773 for the main and side channels. The decoders 771, 772, 773 might, for example, be FEC decoders. In alternative implementations, if no FEC encoding was performed by the transmitting apparatus, then there is no FEC decoding performed by the signal processor 700. The decoders 771, 772, 773 have outputs for outputting recovered data from the main and side channels. In some implementations, the signal processor 700 combines the recovered data from the main and side channels into one signal.

In some implementations, the signal processor 700 implements three independent parallel processors for three channels. This may be preferred from a reduced complexity point of view. However, in other implementations, the signal processor 700 instead implements a joint processing scheme that is more general, but with a possible cost of added complexity.

Figure 8:
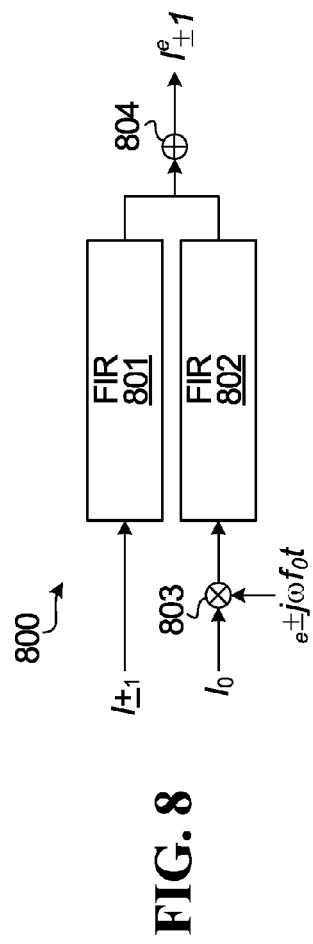
FIG. 8 is a block diagram of an example Inter-Channel Interference (ICI) equalizer that may be implemented in the signal processor of FIG. 7.

Referring now to FIG. 8, shown is a schematic diagram of an example ICI equalizer 800 that may be implemented in the signal processor of FIG. 7 for the ICI equalizer 761 and/or the ICI equalizer 763. The ICI equalizer 800 is a Multiple Input Single Output (MISO) 2×1 multi-tap equalizer, which has a first finite impulse response (FIR) transversal filter 801 for a side channel, and a second FIR transversal filter 802 for a main channel that has been shifted by a frequency shifter 803 for successive interference cancellation. The output of the second FIR transversal filter 802 is added to the output of the first FIR transversal filter 801 by adder 804 in order to compensate for the ICI by the main channel.

As the tap coefficients are calculated based on the received signal in the main and side channels, according to Adaptive Transmission Power Control (ATPC), the ICI equalizer 800 will be updated correspondingly and mitigate the ICI. Because the ICI has both linear and non-linear parts, the linear part will be corrected by the ICI equalizer 800 over the side channels. However, the non-linear part may still be present. For a center frequency of the side channels of $\pm f_c$ where $f_c=(L_1+f_{b2})/2$, the non-linear part is typically negligible. However, if the non-linear part is not negligible, then a non-linear Volterra equalizer can be used to mitigate the non-linear part with the cost of added complexity. Alternatively, the non-linear Volterra equalizer can be omitted if the non-linear part and its negative impact on SNR can be tolerated.

Figure 9:
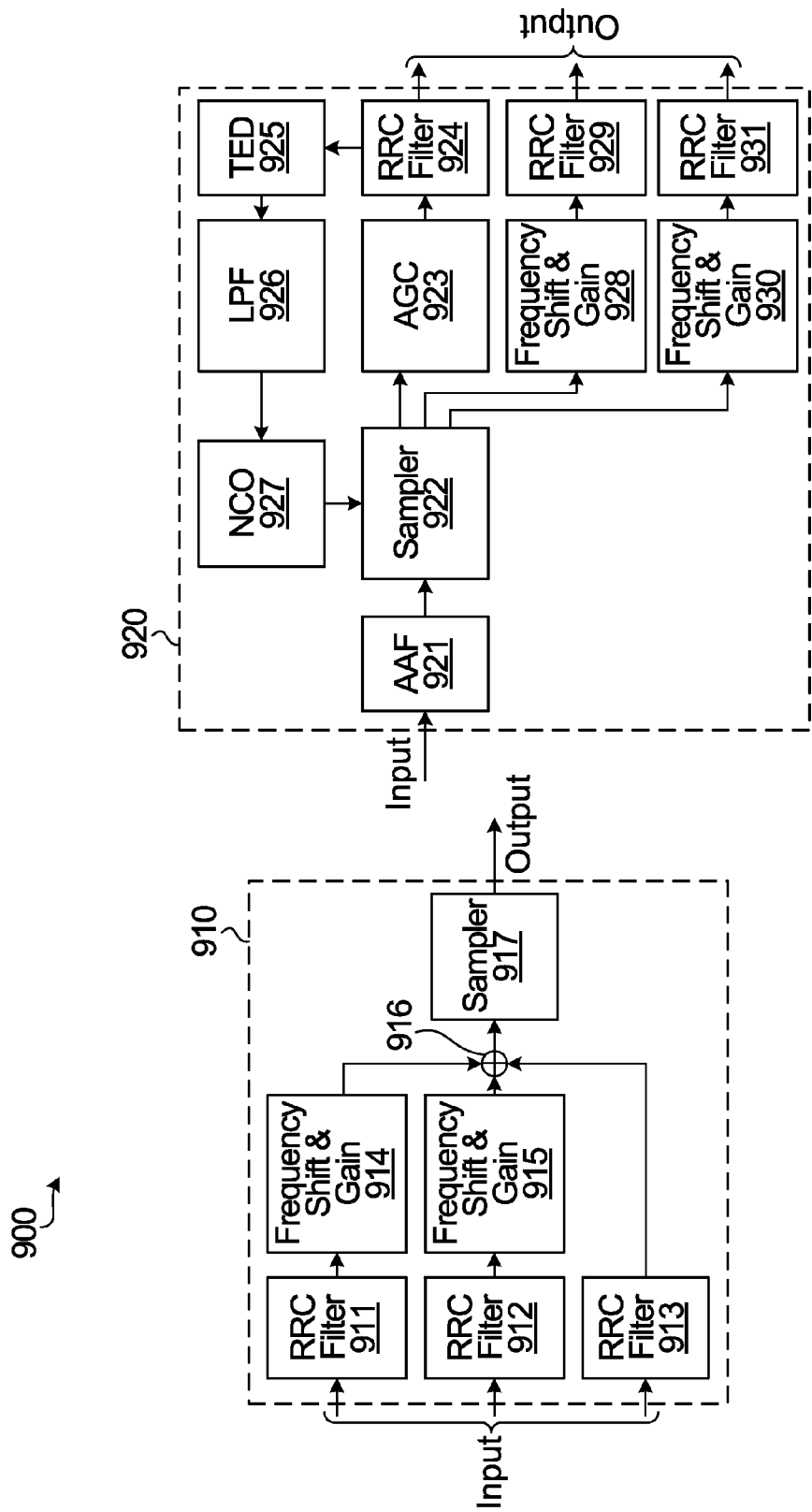
FIG. 9 is a block diagram of an example modem, in accordance with an embodiment of the invention.

Referring now to FIG. 9, shown is a block diagram of an example modem 900 having a transmitting apparatus 910 and a receiving apparatus 920, in accordance with an embodiment of the invention. The transmitting apparatus 910 and the receiving apparatus 920 of FIG. 9 are example embodiments of the signal processor 311 and the signal processor 322 of FIG. 9 and may, for example, be implemented in a DSP. It is to be understood that the modem 900 is shown with very specific components in a very specific arrangement for illustrative purposes only. Other configurations are possible and are within the scope of the invention.

The transmitting apparatus 910 includes components for generating a signal for transmission. The transmitting apparatus 910 has a Root Raised Cosine (RRC) filter 911 for pulse shaping for the left channel, an RRC filter 912 for pulse shaping for the right channel, and an RRC filter 913 for pulse shaping for the middle channel. The left channel is shifted in frequency and amplified by a Frequency Shift &

Gain block 914, and the right channel is shifted in frequency and amplified by a Frequency Shift & Gain block 915. A spectrum stitcher 916 combines the side channels and the middle channel. This involves stitching together a spectrum for the left channel, a spectrum for the middle channel, and a spectrum for the right channel. The combined signal is subjected to interpolation sampling by a sampler 917 prior to transmission by a transmitter (not shown).

In some implementations, the baud-rates for the middle channel and the side channels are 49.5 MHz and 12.375 MHz (i.e. 49.5 MHz/4), respectively. However, other baud-rates are possible. In some implementations, the gap between the middle channel and each side channel is 4 MHz, and the gain by blocks 914 and 915 is −20 dB. Therefore, the middle frequency for the side channels is ±34.9375 MHz. In this example, it is desired to have SNRs of the middle and side channels at 49 dB and 23 dB, respectively.

The receiving apparatus 920 includes components for processing a received signal. The receiving apparatus 920 has an Anti-Aliasing Filter (AAF) 921 for restricting bandwidth of the signal to a band of interest. The restricted signal is then subjected to interpolation sampling by a sampler 922. The sampler 922 performs sampling to separate a spectrum for the left channel, a spectrum for the middle channel, and a spectrum for the right channel. The spectra for the three channels are then processed by three parallel paths. The middle channel is subjected to an Adaptive Gain Controller (AGC) 923 to adjust power level, and an RRC filter 924 for pulse shaping of an output signal. The right channel is shifted in frequency and amplified by a Frequency Shift & Gain block 928, which is complementary to the frequency shift and amplification performed by Frequency Shift & Gain block 914, and then subjected to an RRC filter 929 for pulse shaping of an output signal. The left channel is likewise shifted in frequency and amplified by a Frequency Shift & Gain block 930, which is complementary to the frequency shift and amplification performed by Frequency Shift & Gain block 915, and then subjected to an RRC filter 931 for pulse shaping of an output signal.

In the illustrated example, the sampler 922 performs sampling based on feedback from the processing of the middle channel. In particular, the output of the RRC filter 924 for the middle channel is fed back through a Timing Error Detector (TED) 925, a low pass filter (LPF) 926 and an NCO 927, which creates a synchronous (i.e. clocked) signal with correct timing for the sampler 922. The TED 925 might, for example, implement a Gardner method or any other appropriate method for detecting error in timing. The Gardner method might, for example, recover the clock in a two-fold sampling rate (i.e. two samples per symbol or T/2 sampling space).

In the illustrated example, the side channels do not have a separate circuit for clock synchronization. Instead, they use the same output as the middle channel's clock with division by a ratio of the symbol rate of the main channel to the symbol rate of the side channels. In this case, the side channels use the same output as the middle channel's clock with division by four, because the symbol rate of the main channel is four times that of the side channels as similarly described with reference to FIG. 6. A Minimum Mean Square Error (MMSE) time domain adaptive equalizer (not shown) can provide 49 dB SNR for the middle channel, but may provide only 15 dB SNR for the side channels due to high ICI from the middle channel over to the side channels. In the example above, it is desired to have 23 dB SNR for the side channels, which is greater than the 15 dB that may be available due to the high ICI from the middle channel. To address this, a second stage equalizer as an MISO 2×1 multi-tap ICIC may be implemented for side channels to reach 23 dB SNR. An example ICI equalizer has been described above with reference to FIG. 8.

In some implementations, if there is a larger gap between the middle channel and the side channels, then there might be no need for an ICI equalizer. In some implementations, there may be separate synchronization circuits for each channel instead of using the middle channel circuitry for all three channels. In that case, there might be no need for an ICI equalizer.

Figure 10:
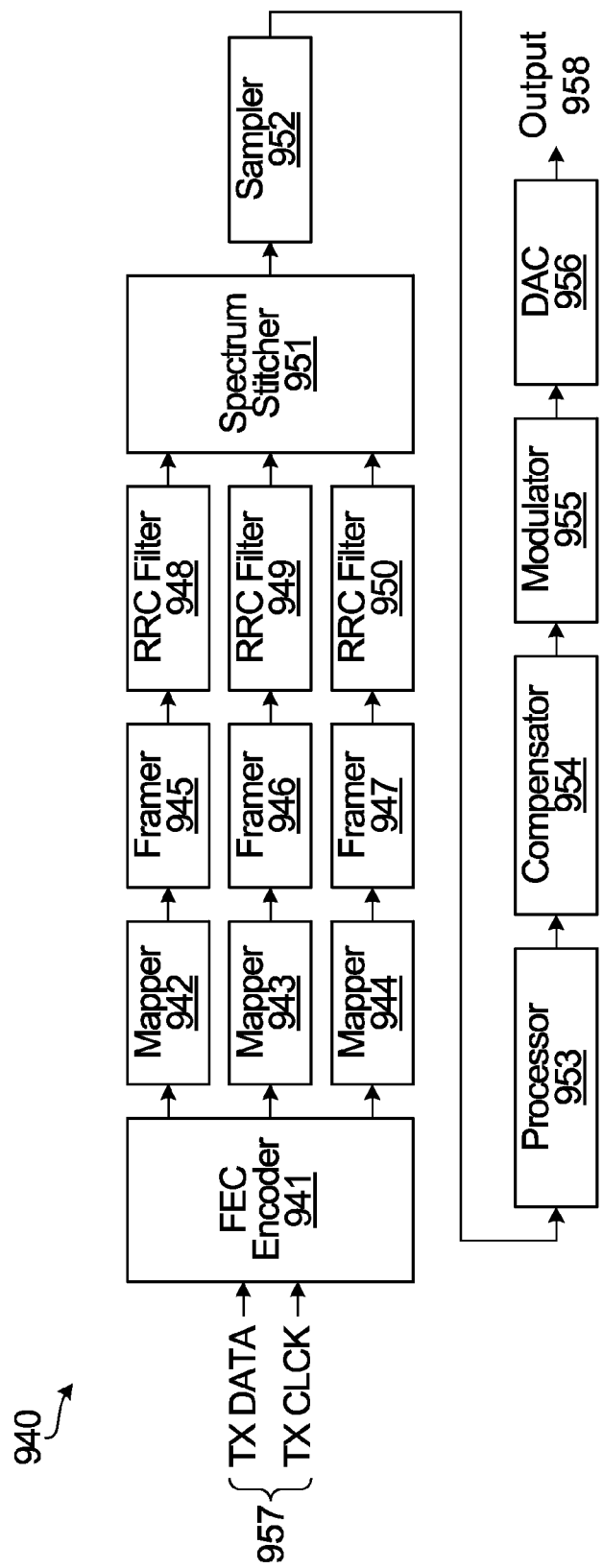
FIG. 10 is a block diagram of an example signal processor of a transmitting apparatus, in accordance with an embodiment of the invention.

Referring now to FIG. 10, shown is block diagram of an example signal processor 940 of a transmitting apparatus, in accordance with an embodiment of the invention. The signal processor 940 of FIG. 10 is an example embodiment of the signal processor 311 of FIG. 3 and might, for example, be implemented in a DSP. It is to be understood that the signal processor 940 is shown with very specific components in a very specific arrangement for illustrative purposes only. Other configurations are possible and are within the scope of the invention.

The signal processor 940 receives inputs 957 including a clock signal and data to be transmitted. The data may be formed as data symbols and encoded using an FEC encoder 941. The FEC encoder 941 generates three parallel paths for the middle and side channels. A mapper 943 maps the data into QAM symbols for the middle channel, a framer 946 assembles the QAM symbols into a data frame, and an RRC filter 949 performs pulse shaping and may reduce ICI between adjacent symbols. The side channels are likewise processed with mappers 942, 944, framers 945, 947, and RRC filters 948, 950.

Next, a spectrum stitcher 951 generates a signal having the three channels side-by-side as similarly shown in FIG. 2 for example. This involves stitching together a spectrum for the left channel, a spectrum for the middle channel, and a spectrum for the right channel. Spectrum stitching can be implemented in a frequency domain or in a time domain as previously described. The signal having the three channels is then passed through a sampler 952 for interpolation sampling and then through a Digital Pre-Distortion (DPD) processor 953 for digital pre-distortion processing. This processing may compensate for non-linear distortion created by power amplification. Next, a compensator 954 performs compensation, which may allow for adjustment of any imbalance between channels. Next, a modulator 955 performs modulation to generate a modulated signal. Finally, a DAC 956 converts the modulated signal to an output 958 for transmission by a transmitter (not shown).

Figure 11:
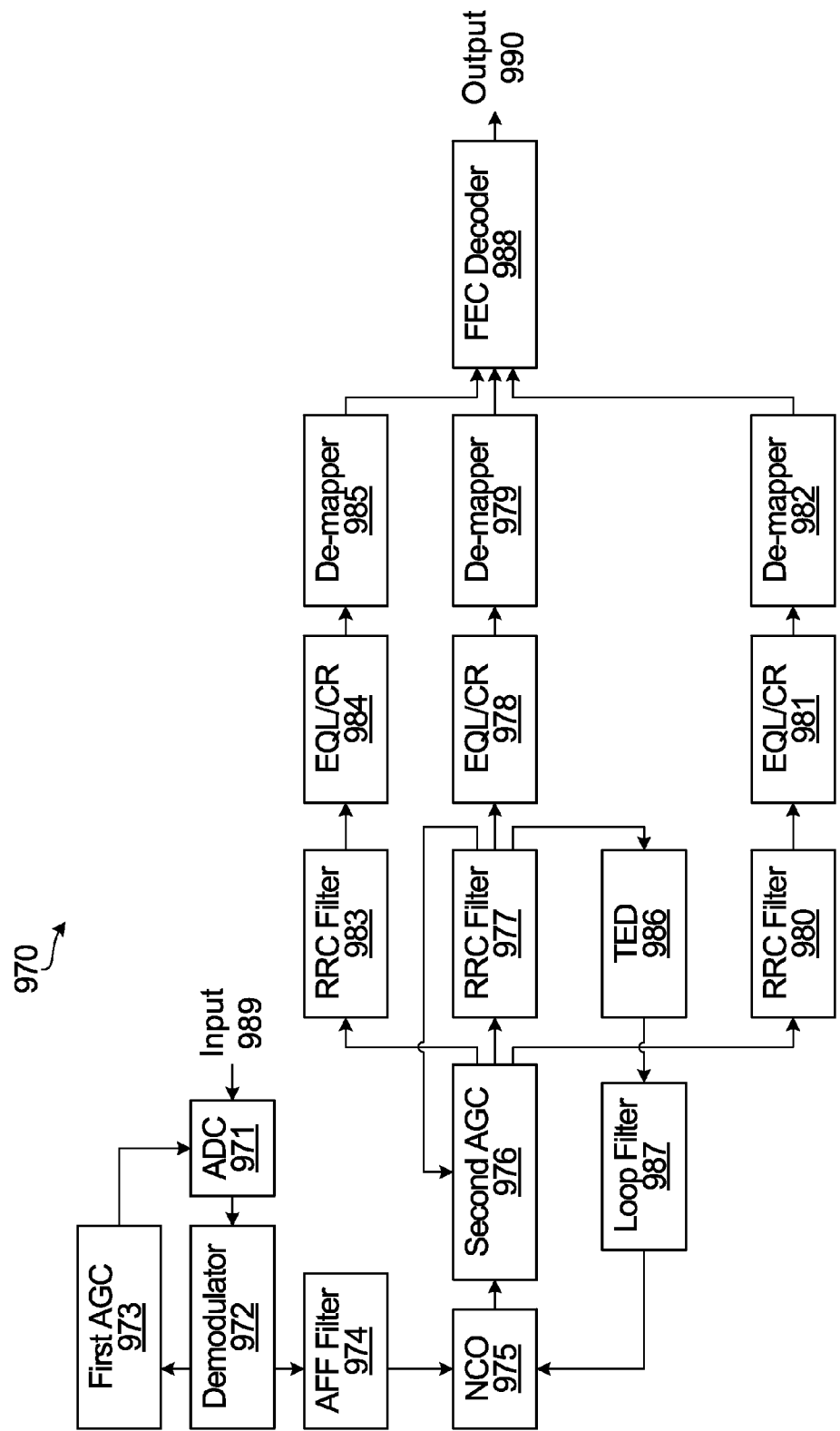
FIG. 11 is a block diagram of an example signal processor of a receiving apparatus, in accordance with an embodiment of the invention.

Referring now to FIG. 11, shown is a block diagram of a signal processor 970 of a receiving apparatus, in accordance with an embodiment of the invention. The signal processor 970 of FIG. 11 is an example embodiment of the signal processor 321 of FIG. 3 and might, for example, be implemented in a DSP. It is to be understood that the signal processor 970 is shown with very specific components in a very specific arrangement for illustrative purposes only. Other configurations are possible and are within the scope of the invention.

The signal processor 970 receives an input signal 989. The input signal 989 is converted from an analog signal to a digital signal by an ADC 971. The digital signal is processed by a demodulator 972 in order to demodulate the signal. This demodulation is complementary to the modulation performed by the modulator 955 shown in FIG. 10. Based on such demodulation, feedback is provided through a first AGC 973 to adjust power level of the conversion by the ADC 971. The demodulated signal is processed by an Adaptive Feed Forward (AFF) filter 974. The AFF filter 974 performs equalization and corrects frequency with a fixed frequency offset.

Next, an NCO 975 creates a synchronous (i.e. clocked) signal from the output of the AFF filter 974. The timing of the signal is controlled with feedback. The second AGC 976 adjusts the gain of the synchronous signal, and then to an RRC filter 977 for pulse shaping of the middle channel. The RRC filter 977 provides feedback to the second AGC 976 in order to adjust gain of the second AGC 976. A TED 986 and a loop filter 987 provide feedback for the timing of the synchronous signal generated by the NCO 975. The TED 986 might, for example, implement a Gardner method or any other appropriate method for detecting error in timing. Equalization and carrier recovery (EQL/CR) are performed on the output of the RRC filter 977 at block 978. Next, the recovered signal is demapped by a de-mapper 979.

The output of the second AGC 976 is also provided to RRC filters 983, 980 for pulse shaping of the side channels. Equalization and carrier recovery are performed on the output of the RRC filters 983, 980 at blocks 984, 981. Next, the recovered signals are demapped by de-mappers 985, 982.

The recovered signals for the middle channel and the side channels are combined and subjected to FEC decoding by an FEC decoder 988 to produce an output 990, which is a combination of the recovered signals. In alternative implementations, if no FEC encoding was performed by the transmitting apparatus, then there is no FEC decoding performed by the signal processor 970.

Methods for Transmitting and Receiving Wireless Signals

Figure 12:
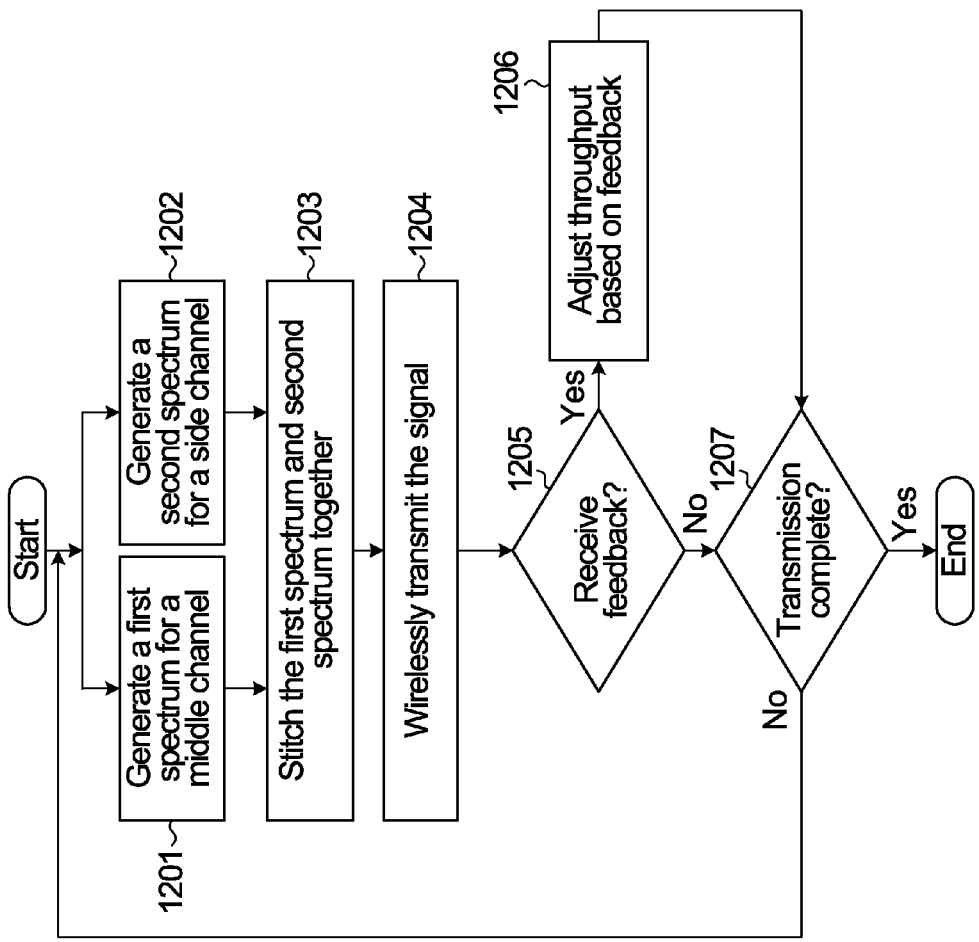
FIG. 12 is a flow chart of an example method for transmitting wireless signals, in accordance with an embodiment of the invention.

Referring now to FIG. 12, shown is a flow chart of an example method for transmitting wireless signals, in accordance with an embodiment of the invention. This method may be implemented by a transmitting apparatus such as the transmitting apparatus 310 shown in FIG. 3 for example.

At steps 1201 through 1203, the transmitting apparatus generates a signal that will be transmitted subject to a spectral mask. In particular, at step 1201 the transmitting apparatus generates a first spectrum for a middle channel based on a first data stream, and at step 1202 the transmitting apparatus generates a second spectrum for a side channel based on a second data stream. In some implementations, the first data stream and the second data stream have been split from one data stream containing data to be transmitted as previously described. In other implementations, the first data stream and the second data stream originate as independent data streams to be transmitted. In some implementations, the transmitting apparatus performs bit loading of bits when generating the first spectrum and the second spectrum as previously described. Next, at step 1203, the transmitting apparatus stitches the first spectrum and the second spectrum together, thereby generating a signal having both the middle channel and the side channel.

In some implementations, steps 1201 and 1202 are executed concurrently in parallel as shown in FIG. 12. However, in other implementations, steps 1201 and 1202 are executed one after another. The transmitting apparatus may also generate additional spectra for any additional side channels. If any additional spectra have been generated for any additional side channels, then these additional spectra are also stitched with the first spectrum and the second spectrum when generating the signal. In some implementations, all channels have synchronous timing.

Steps 1201 through 1203 are executed such that the resulting spectrum of the signal generated at step 1203 complies with the spectral mask. In accordance with an embodiment of the invention, the signal is generated such that each side channel of the signal is positioned in one of the shoulder regions of the spectral mask. An example of such positioning is shown in FIG. 2 for a given spectral mask in the case of two side channels for illustrative purposes. In this manner, bandwidth from the shoulder regions can be utilized by one or more side channels.

At step 1204, the transmitting apparatus wirelessly transmits the signal, for example as a microwave or millimeter wave signal. The wireless signal is sent over an air link to a receiving apparatus.

In some implementations, as in the illustrated example, the transmitting apparatus receives feedback from the receiving apparatus. There are many possibilities for this feedback. In some implementations, the feedback includes an indication of the signal quality for the middle channel and each side channel. In some implementations, the feedback includes an indication to enable or disable a side channel. Further details of the feedback have been provided above and are not repeated here.

If at step 1205 the transmitting apparatus receives feedback, then at step 1206 the transmitting apparatus adjusts throughput of the transmission based on the feedback. For instance, the transmitting apparatus may vary a power and/or an ACM of the middle channel, and/or vary an ACM of the side channels. Additionally, or alternatively, the transmitting apparatus may disable or enable a side channel. Further details of how throughput can be adjusted have been provided above and are not repeated here.

If at step 1207 the transmission is complete, then the method concludes. However, if at step 1207 the transmission is not complete because there is more data to send, then the method loops back to step 1201. Steps 1201 through 1204 are repeated until the transmission is complete. Step 1206 is repeated when and if feedback is received at step 1205.

In alternative implementations, the transmitting apparatus may perform the transmission without any feedback as previously described. For such alternative implementations, there may not be any adjustment of throughput at step 1206.

Figure 13:
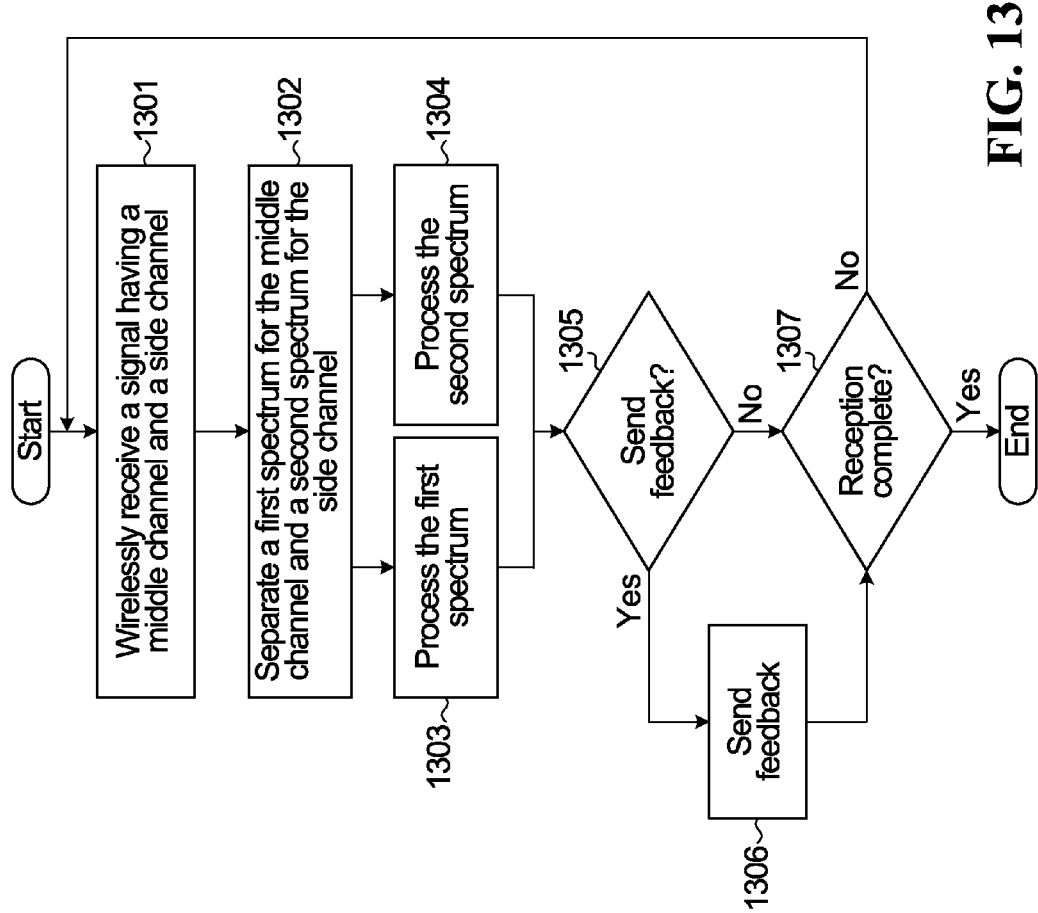
FIG. 13 is a flow chart of an example method for receiving wireless signals, in accordance with an embodiment of the invention.

Referring now to FIG. 13, shown is a flow chart of an example method for receiving wireless signals, in accordance with an embodiment of the invention. This method may be implemented by a receiving apparatus such as the receiving apparatus 320 shown in FIG. 3 for example.

At step 1301, the receiving apparatus wirelessly receives a signal subject to a spectral mask that has shoulder regions. The signal as received might be a microwave signal or a millimeter wave signal for example. The signal includes a middle channel and at least one side channel. In accordance with an embodiment of the invention, each side channel is positioned in one of the shoulder regions of the spectral mask. An example of such positioning is shown in FIG. 2 for a given spectral mask in the case of two side channels for illustrative purposes. In this manner, bandwidth from the shoulder regions can be utilized by one or more side channels.

At steps 1302 through 1304, the receiving apparatus processes the signal for signal recovery. In particular, at step 1302 the receiving apparatus separates, from the received signal, a first spectrum for the middle channel. For each side channel, the receiving apparatus also separates a second spectrum for the side channel. At step 1303, the receiving apparatus processes the first spectrum to recover a first data stream. At step 1304, the receiving apparatus processes the second spectrum to recover a second data stream.

In some implementations, steps 1303 and 1304 are executed concurrently in parallel as shown in FIG. 13. However, in other implementations, steps 1303 and 1304 are executed one after another. The receiving apparatus may also process additional spectra for any additional side channels. If any additional spectra for any additional side channels have been separated at step 1302, then these additional spectra are also processed to recover additional data streams. In some implementations, the receiving apparatus combines, into one data stream, all of the data streams recovered from the middle and side channels as previously described. In other implementations, the receiving apparatus leaves the data streams recovered from the middle and side channels as separate data streams.

In some implementations, the receiving apparatus processes the middle channel and applies at least one result of that processing for decision feedback correction of each side channel as previously described. This may reduce complexity of the receiving apparatus. In some implementations, the receiving apparatus performs interference cancellation for each side channel based on a result of processing the middle channel as previously described. Further details of how the signal may be processed have been provided above and are not repeated here.

In some implementations, as in step 1305, the receiving apparatus determines whether to send feedback to the transmitting apparatus. The receiving apparatus might, for example, send feedback only when there has been a measured change to signal quality. Alternatively, the receiving apparatus might send feedback on a periodic basis regardless of whether there has been any measured change to signal quality.

If at step 1305 the receiving apparatus determines that feedback is to be sent, then at step 1306 the receiving apparatus sends feedback. The feedback may be used by the transmitting apparatus to adjust throughput of the wireless signal as previously described. Further details of the feedback have been provided above and are not repeated here.

In alternative implementations, the receiving apparatus does not provide any feedback.

If at step 1307 the reception is complete, then the method concludes. However, if at step 1307 the transmission is not complete because there is more data to receive, then the method loops back to step 1301. Steps 1301 through 1305 are repeated until the reception is complete. Step 1306 is repeated when and if feedback is to be sent as determined by step 1305.

Example Implementations

Examples of possible implementations of the present invention are described in this section. It is to be understood that these implementations are very specific and are provided for illustrative purposes only.

Figure 14:
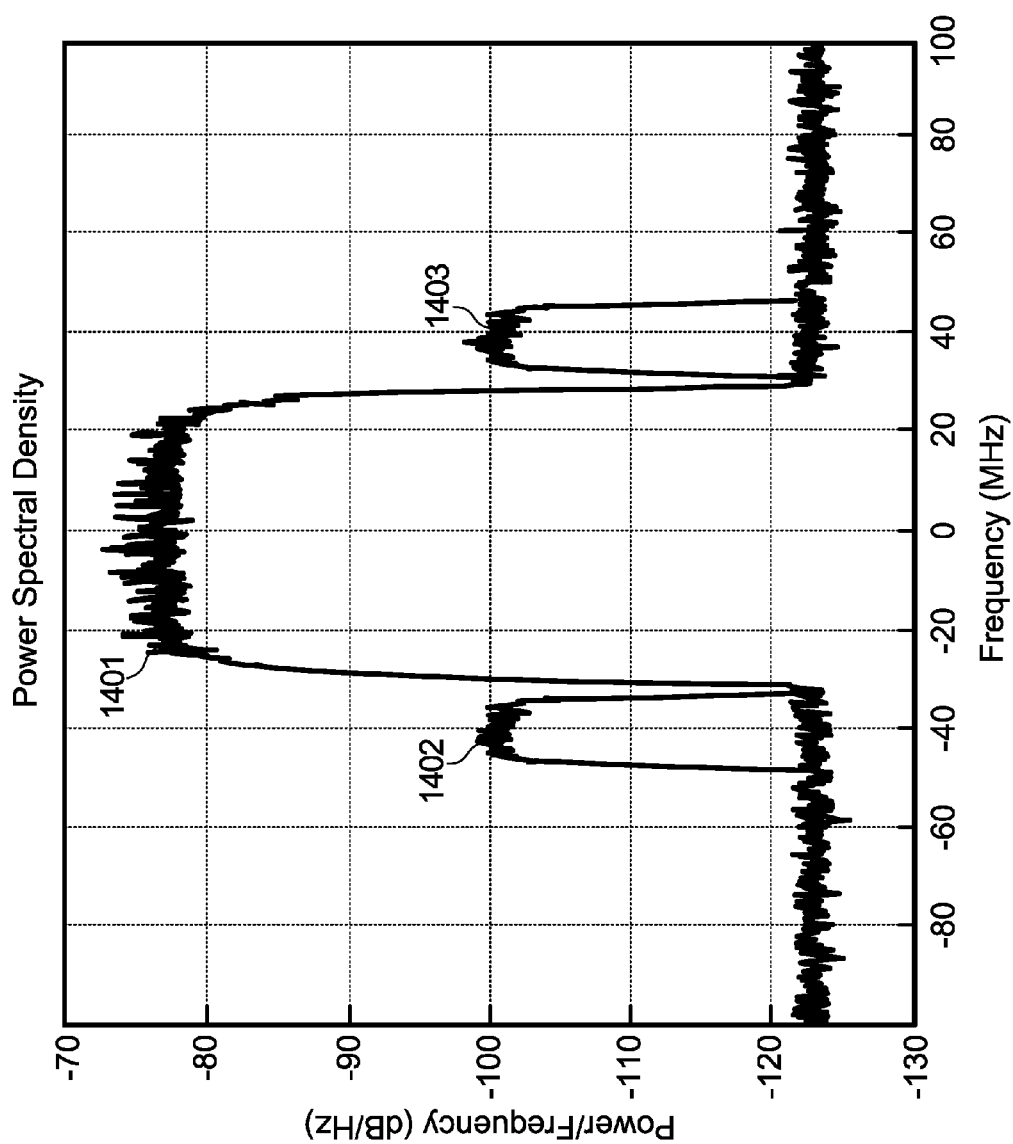
FIG. 14 is a graph showing an example power spectral density for a three-channel signal, in accordance with an embodiment of the invention.

Referring now to FIG. 14, shown is a graph showing an example power spectral density for a three-channel signal, in accordance with an embodiment of the invention. This graph shows a middle channel 1401 and side channels 1402, 1403 when the side channels 1402, 1403 have each been subjected to ICI equalization to compensate for ICI on the side channels 1402, 1403 from the middle channel 1401. Use of ICI equalization might, for example, improve a minimum square error on the side channels by 8 dB.

As previously mentioned, the data-rate that can be achieved may depend on several factors including the power level of the middle channel 1401. While ICI equalization can help to compensate for ICI on the side channels 1402, 1403 from the middle channel 1401, the data-rate that can be achieved may be greater when the power level of the middle channel 1401 is reduced. Examples of this will be described below with reference to FIGS. 15 and 16.

Figure 15:
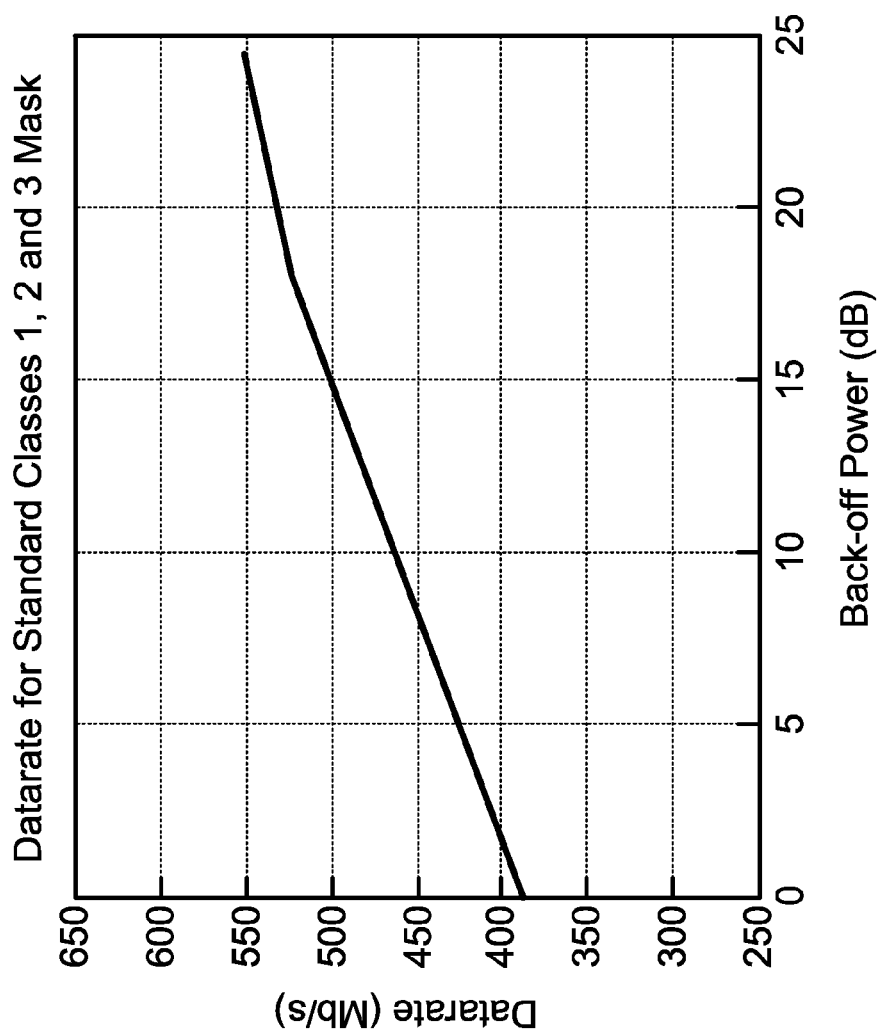
FIGS. 15 and 16 are graphs showing example data-rates that may be achieved as power level of a middle channel is adjusted.

Referring now to FIG. 15, shown is a graph showing example data-rates that may be achieved as power level of a middle channel is adjusted. In this example, the middle channel and each side channel are subject to the spectral mask of FIG. 4C with the parameters listed in Table 1 below.

TABLE 1

Parameters for spectral mask of FIG. 4C

| | | | Parameter | | | |
|---|---|---|---|---|---|---|
| $k_1$ | $f_2$ | $k_3$ | $f_3$ | $f_4$ | $k_5$ | $f_5$ |
| Value 2 dB | 12.8 MHz | −23 dB | 16.4 MHz | 25 MHz | −45 dB | 45 MHz |

This spectral mask is a standard class 1, 2 and 3 mask used for 28 MHz channelization transmission. RRC filters with a roll-off-factor of 0.2 are used for pulse shaping for all signals. To transmit a single-carrier signal with full-power, the maximum achievable baud-rate is 27 Mbaud. So the maximum data-rate using 2048QAM (11 bits/symbol) is 27 Mbaud×11 bits/symbol=297 Mb/s.

When three channels are used, the middle channel will be the same as a single-carrier with 27 Mbaud. Each side channel can have a baud-rate of 11.3 Mbaud, and their center frequency is ±22.05 MHz. The side channels have the same pulse shape as the middle channel with a roll-off-factor of 0.2. Because the minimum SNR for 2048QAM is around 36 dB, and $k_3$ is −24 dB, the side channels have SNR of 14 dB, which makes it possible to transmit 16QAM (4 bits/symbol). The total achievable data-rate is 11.3 Mbaud×4 bits/symbol×2 side channels+297 Mb/s=387.4 Mb/s, which is more than 30% increase in data-rate compared with using only the middle channel as a single-carrier.

In the case of 6 dB back-off power, the modulation order can increase to 64QAM (6 bits/symbol) because of a 6 dB improvement in channel conditions. The baud-rates do not need to be changed. Thus, a data-rate of 11.3 Mbaud×6 bits/symbol×2 side channels+297 Mb/s=432.6 Mb/s may be achieved. The maximum data-rate for other back-off values is summarized in Table 2 below and plotted in FIG. 15.

TABLE 2

Example data-rate for spectral mask of FIG. 4C

| Back-Off Power | Side Channel Modulation | Data-Rate |
|---|---|---|
| 0 dB | 16 QAM | 387.4 Mb/s |
| 6 dB | 64 QAM | 432.6 Mb/s |
| 12 dB | 256 QAM | 477.8 Mb/s |
| 18 dB | 1024 QAM | 523 Mb/s |
| 24 dB | 2048 QAM | 545.6 Mb/s |

The data-rate can be increased while maintaining the baud-rates. Some systems that change baud-rates may need to be restarted upon a change to the baud-rate. By avoiding changes to the baud-rates, the present system may be "hitless" in the sense that it avoids such restarts.

Figure 16:
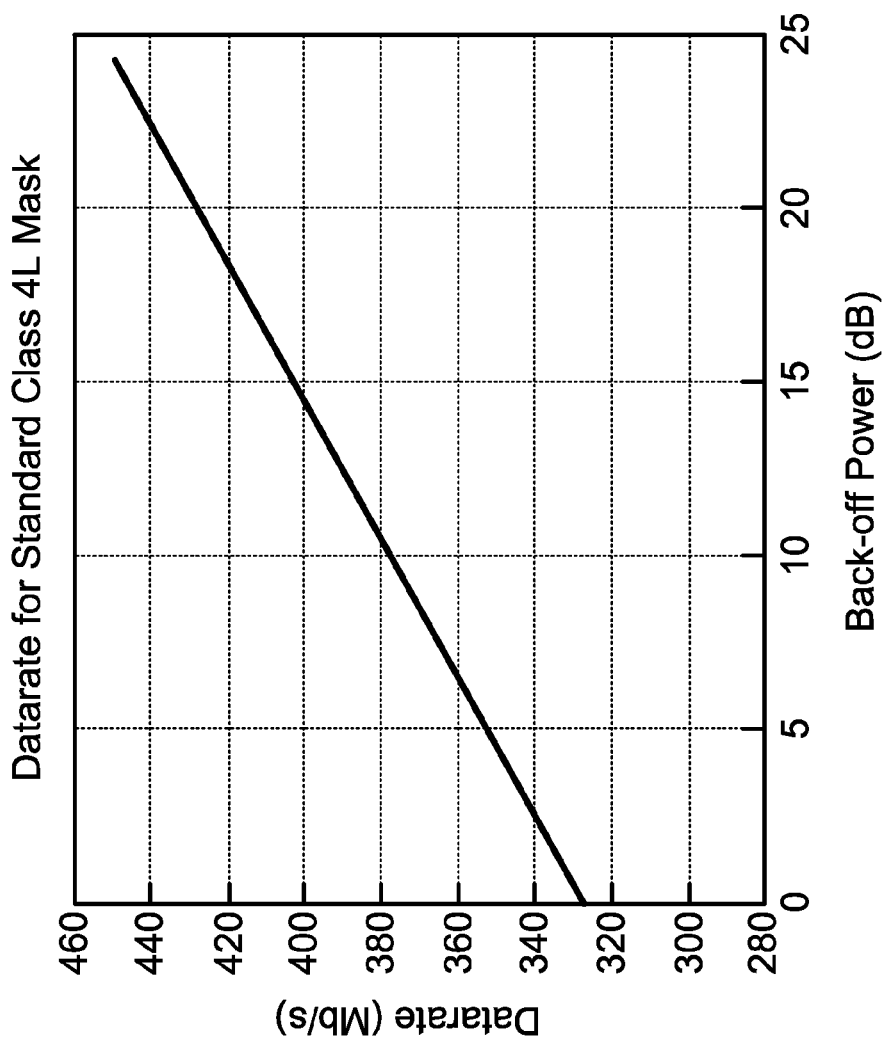

Referring now to FIG. 16, shown is a graph showing example data-rates that may be achieved as power level of a middle channel is adjusted. In this example, the middle channel and each side channel is subject to the spectral mask of FIG. 4D is used with the parameters listed in Table 2 below.

TABLE 2

Parameters for spectral mask of FIG. 4D

| | Parameter | | | | | |
|---|---|---|---|---|---|---|
| | $k_1$ | $f_2$ | $k_3$ | $f_3$ | $f_5$ | $k_5$ |
| Value | 2 dB | 12.8 MHz | −27 dB | 17 MHz | 56 MHz | −55 dB |

This spectral mask is a standard class 4 L mask used for 28 MHz channelization transmission. RRC filters with a roll-off-factor of 0.2 are used for pulse shaping for all signals. To transmit a single-carrier signal with full-power, the maximum achievable baud-rate is 27 Mbaud. So the maximum data-rate using 2048QAM (11 bits/symbol) is 27 Mbaud×11 bits/symbol=297 Mb/s.

When three channels are used, the middle channel will be the same as a single-carrier with 27 Mbaud. Each side channel can have a baud-rate of 7.5 Mb/s, and their center frequency is ±21.25 MHz. The side channels have the same pulse shape as the middle channel with a roll-off-factor of 0.2. Because the minimum SNR for 2048QAM is around 36 dB, and the side channels are 29 dB lower, the side channels have SNR of 7 dB, which makes it possible to transmit 4QAM (2 bits/symbol). The total achievable data-rate is 7.5 Mbaud×2 bits/symbol×2 side channels+297 Mb/s=327 Mb/s, which is about 10% increase in data-rate compared with using only the middle channel as a single-carrier.

The interference between the side channels and the middle channel is limited, and the overall overlap is less than 0.4 MHz. This makes the ICI negligible, and as a result, there might be no need for ICI equalization without any performance loss.

In the case of 6 dB back-off power, the modulation order can increase to 16QAM (4 bits/symbol) because of a 6 dB improvement in channel conditions. The baud-rates do not need to be changed. Thus, a data-rate of 7.5 Mbaud×4 bits/symbol×2 side channels+297 Mb/s=357 Mb/s may be achieved. The maximum data-rate for other back-off values is summarized in Table 4 below and plotted in FIG. 16.

TABLE 4

Example data-rate for spectral mask of FIG. 4D

| Back-off power | Side Channel Modulation | Data-Rate |
|---|---|---|
| 0 dB | 4 QAM | 327 Mb/s |
| 6 dB | 16 QAM | 357 Mb/s |
| 12 dB | 64 QAM | 387 Mb/s |
| 18 dB | 256 QAM | 417 Mb/s |
| 24 dB | 1024 QAM | 447 Mb/s |

Numerous modifications and variations of the present invention are possible in light of the above teachings. It is therefore to be understood that within the scope of the appended claims, the invention may be practised otherwise than as specifically described herein.

We claim:

1. A method comprising:
    generating a signal comprising a middle channel and a side channel such that the side channel is positioned in a shoulder region of a spectral mask; and
    wirelessly transmitting the signal subject to the spectral mask;
    wherein the signal as transmitted is a microwave or millimeter wave signal;
    varying at least one of a power and an Adaptive Coding and Modulation (ACM) of the middle channel based on a received feedback signal.

2. The method of claim 1, further comprising:
    varying an Adaptive Coding and Modulation (ACM) of the side channel based on a received feedback signal.

3. The method of claim 1, wherein the side channel is a first side channel, the shoulder region is a first shoulder region of the spectral mask, and the method further comprises:
    selectively enabling or disabling a second side channel in a second shoulder region of the spectral mask.

4. The method of claim 3, comprising:
    selectively enabling or disabling the second side channel based on a received feedback signal.

5. The method of claim 1, wherein the shoulder region of the spectral mask is used by the side channel to increase throughput for the signal compared to not using the side channel.

6. The method of claim 1, wherein the signal is a single carrier signal.

7. A method comprising:
    generating a signal comprising a middle channel and a side channel such that the side channel is positioned in a shoulder region of a spectral mask; and
    wirelessly transmitting the signal subject to the spectral mask;
    wherein the signal as transmitted is a microwave or millimeter wave signal;
    wherein generating the signal comprises:
    splitting a single received data stream into a plurality of data streams including a first data stream and a second data stream;
    generating a first spectrum for the middle channel based on the first data stream;
    generating a second spectrum for the side channel based on the second data stream; and
    generating the signal by stitching the first spectrum and the second spectrum together.

8. The method of claim 7, wherein:
    generating the first spectrum comprises performing bit loading of bits of the first data stream for the middle channel; and
    generating the second spectrum comprises performing bit loading of bits of the second data stream for the side channel.

9. The method of claim 8, wherein the middle channel and the side channel have synchronous timing.

10. An apparatus comprising:
    a signal processor configured to generate a signal comprising a middle channel and a side channel such that the side channel is positioned in a shoulder region of a spectral mask; and
    a transmitter configured to wirelessly transmit the signal subject to the spectral mask;
    wherein the transmitter is configured to wirelessly transmit the signal as a microwave or millimeter wave signal;
    the side channel is a first side channel, and the shoulder region is a first shoulder region of the spectral mask; and
    the signal processor is configured to selectively enable or disable a second side channel in a second shoulder region of the spectral mask.

11. The apparatus of claim 10, wherein the signal processor comprises:

a first pulse shaper for generating a first spectrum for the middle channel based on a first data stream;

a second pulse shaper for generating a second spectrum for the side channel based on a second data stream; and a spectrum stitcher for generating the signal by stitching the first spectrum and the second spectrum together.

12. The apparatus of claim 10, wherein:

the signal processor is configured to vary at least one of a power and an Adaptive Coding and Modulation (ACM) of the middle channel based on a received feedback signal.

13. The apparatus of claim 10, wherein:

the signal processor is configured to vary an Adaptive Coding and Modulation (ACM) of the side channel based on a received feedback signal.

14. The apparatus of claim 10, wherein the shoulder region of the spectral mask is used by the side channel to increase throughput for the signal compared to not using the side channel.

15. The apparatus of claim 10, wherein the signal is a single carrier signal.

16. An apparatus comprising:

a receiver configured to wirelessly receive a signal subject to a spectral mask, the signal comprising a middle channel and a side channel that is positioned in a shoulder region of the spectral mask; and a signal processor configured to process the signal to separate a first spectrum for the middle channel and a second spectrum for the side channel, process the first spectrum to recover a first data stream, and process the second spectrum to recover a second data stream;

wherein the receiver is configured to receive the signal as a microwave signal or a millimeter wave signal;

the signal processor comprises an Inter-Channel Interference (ICI) equalizer for interference cancellation for the side channel based on a result of processing the middle channel.

* * * * *

UNITED STATES PATENT AND TRADEMARK OFFICE
CERTIFICATE OF CORRECTION

| | | |
|---|---|---|
| PATENT NO. | : 9,602,151 B1 | Page 1 of 1 |
| APPLICATION NO. | : 14/840457 | |
| DATED | : March 21, 2017 | |
| INVENTOR(S) | : Mahdi Zamani et al. | |

It is certified that error appears in the above-identified patent and that said Letters Patent is hereby corrected as shown below:

On the Title Page

Insert below Item (22):
--(65)  Prior Publication Data
        US 2017/0063408 A1    March 2, 2017--

Signed and Sealed this
Twenty-third Day of May, 2017

Michelle K. Lee
*Director of the United States Patent and Trademark Office*